(12) United States Patent
Chatterjee et al.

(10) Patent No.: US 7,742,584 B2
(45) Date of Patent: Jun. 22, 2010

(54) MOBILE DEVICE CALLS VIA PRIVATE BRANCH EXCHANGE

(75) Inventors: Saurav Chatterjee, San Jose, CA (US); Josh Perfetto, San Jose, CA (US); Hemendra Rana, San Jose, CA (US); Paul Fullarton, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 101 days.

(21) Appl. No.: 11/726,483

(22) Filed: Mar. 21, 2007

(65) Prior Publication Data

US 2007/0253545 A1 Nov. 1, 2007

Related U.S. Application Data

(63) Continuation-in-part of application No. 10/890,922, filed on Jul. 14, 2004.

(60) Provisional application No. 60/487,143, filed on Jul. 14, 2003, provisional application No. 60/784,747, filed on Mar. 21, 2006.

(51) Int. Cl.
*H04M 3/42* (2006.01)
*H04L 12/16* (2006.01)
*H04L 12/66* (2006.01)
*H04M 3/56* (2006.01)
*H04L 12/18* (2006.01)

(52) U.S. Cl. .................. 379/201.01; 370/259; 370/260; 370/352; 379/202.01; 379/207.01; 455/414.1; 455/416

(58) Field of Classification Search ............ 379/211.02, 379/142.01, 202.01–206.01, 207.01, 201.01; 370/352, 260–262, 259; 455/552.1, 416, 455/414.1
See application file for complete search history.

(56) References Cited

U.S. PATENT DOCUMENTS

| 5,278,890 A | 1/1994 | Beeson et al. |
| 5,732,348 A | 3/1998 | Norimatsu |
| 5,903,629 A | 5/1999 | Campbell |

(Continued)

OTHER PUBLICATIONS

PCT International Search Report, International Application No. PCT/US2006/033181, Apr. 25, 2007.

(Continued)

*Primary Examiner*—Harry S Hong
(74) *Attorney, Agent, or Firm*—Tucker Ellis & West LLP

(57) ABSTRACT

Communication systems and methods are described that enable mobile devices to route telephone calls via an enterprise telephone system. The communication system is configured to receive via a data channel a request from the mobile device. The mobile device corresponds to a user making a call. The server receiving the request includes a private branch exchange (PBX) and one or more other servers hosted by or coupled to the enterprise. A first call leg is initiated over a first voice channel in response to the request. The first call leg is coupled to the server and mobile device. A second call leg is initiated over a second voice channel, and the second call leg is coupled to the server and a client device corresponding to an intended call recipient. A voice conference call is formed between the mobile device and client device by joining the first and second call legs.

41 Claims, 23 Drawing Sheets

U.S. PATENT DOCUMENTS

| | | |
|---|---|---|
| 6,092,097 A | 7/2000 | Suzuoka |
| 6,147,977 A | 11/2000 | Thro |
| 6,272,214 B1 | 8/2001 | Jonsson |
| 6,345,288 B1 | 2/2002 | Reed |
| 6,351,656 B1 | 2/2002 | Burgan |
| 6,373,817 B1 | 4/2002 | Kung |
| 6,424,711 B1 | 7/2002 | Bayless |
| 6,751,297 B2 | 6/2004 | Nelkenbaum |
| 6,754,181 B1 | 6/2004 | Elliott |
| 6,920,486 B2 | 7/2005 | Kiiskinen |
| 2002/0159409 A1 | 10/2002 | Wolfe |
| 2002/0191595 A1 | 12/2002 | Mar et al. |
| 2003/0120593 A1 | 6/2003 | Bansal |
| 2003/0129963 A1 | 7/2003 | Nurcahya |
| 2004/0157613 A1 | 8/2004 | Steer et al. |
| 2004/0248600 A1 | 12/2004 | Kim |
| 2005/0041647 A1 | 2/2005 | Stinnie |
| 2005/0068980 A1 | 3/2005 | Mathew |
| 2005/0272413 A1 | 12/2005 | Bourne |
| 2006/0141982 A1 | 6/2006 | Timmins |
| 2007/0022058 A1 | 1/2007 | Labrou |
| 2007/0025333 A1* | 2/2007 | Sylvain ..................... 370/352 |
| 2007/0036127 A1 | 2/2007 | Roosen et al. |
| 2007/0070980 A1* | 3/2007 | Phelps et al. ................ 370/352 |
| 2007/0111752 A1* | 5/2007 | Pazhyannur ............. 455/552.1 |
| 2007/0172045 A1* | 7/2007 | Nguyen et al. ......... 379/202.01 |
| 2007/0201647 A1* | 8/2007 | Batni et al. ............ 379/142.01 |
| 2007/0223401 A1 | 9/2007 | Chatterjee et al. |
| 2007/0223509 A1 | 9/2007 | Chatterjee et al. |
| 2007/0223679 A1 | 9/2007 | Chatterjee et al. |

OTHER PUBLICATIONS

PCT International Search Report, International Application No. PCT/US2006/033071, Apr. 20, 2007.
PCT International Search Report, International Application No. PCT/US2007/000487, Oct. 18, 2007.
PCT International Search Report, International Application No. PCT/US2007/007064, Jun. 30, 2008.
PCT International Search Report, International Application No. PCT/US2008/079910, Mar. 16, 2009.
Written Opinion of the International Searching Authority for Application No. PCT/US2008/079910 Mar. 16, 2009.

* cited by examiner

FIG.9/1
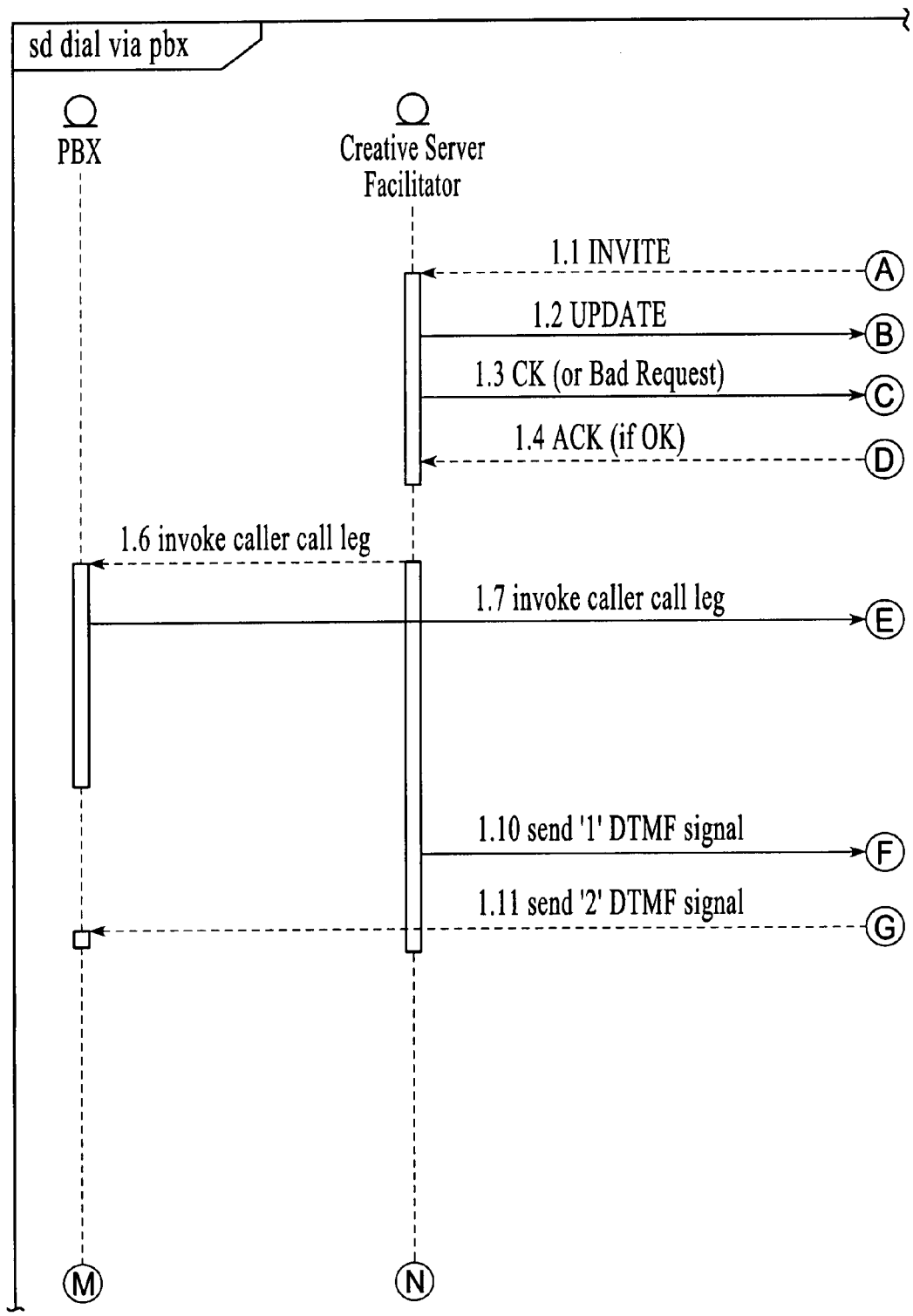

FIG.9/2
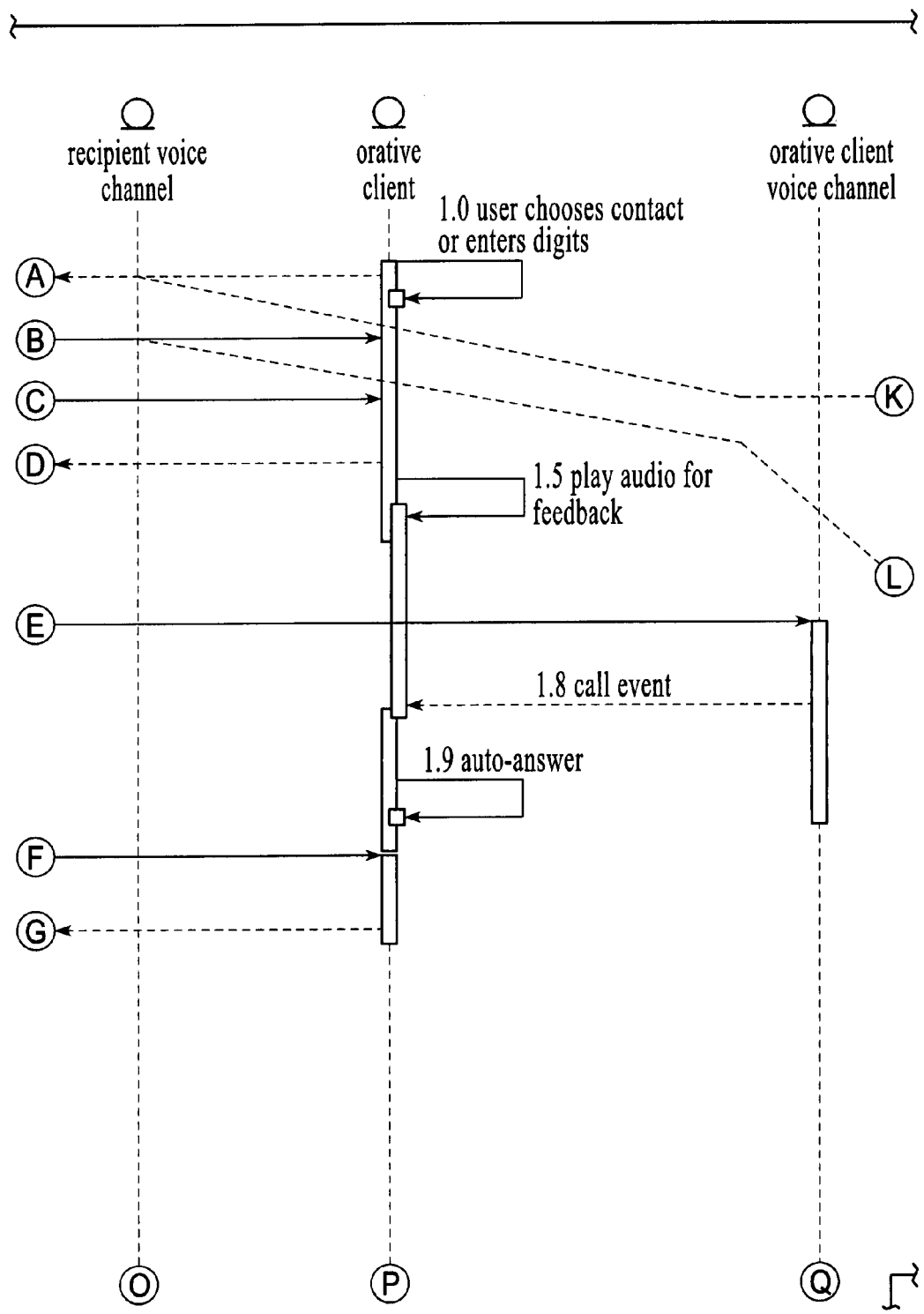

FIG.9/3
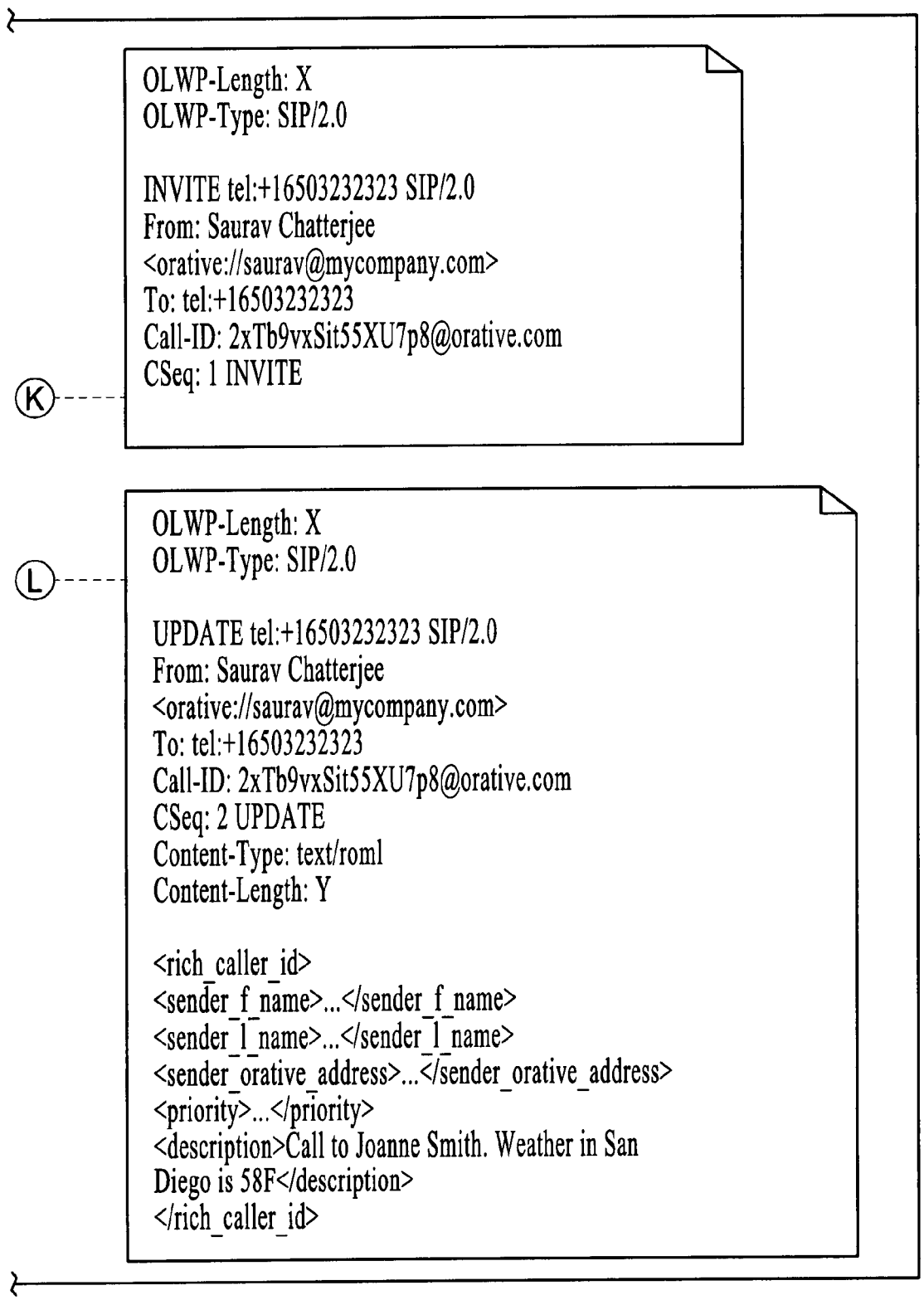

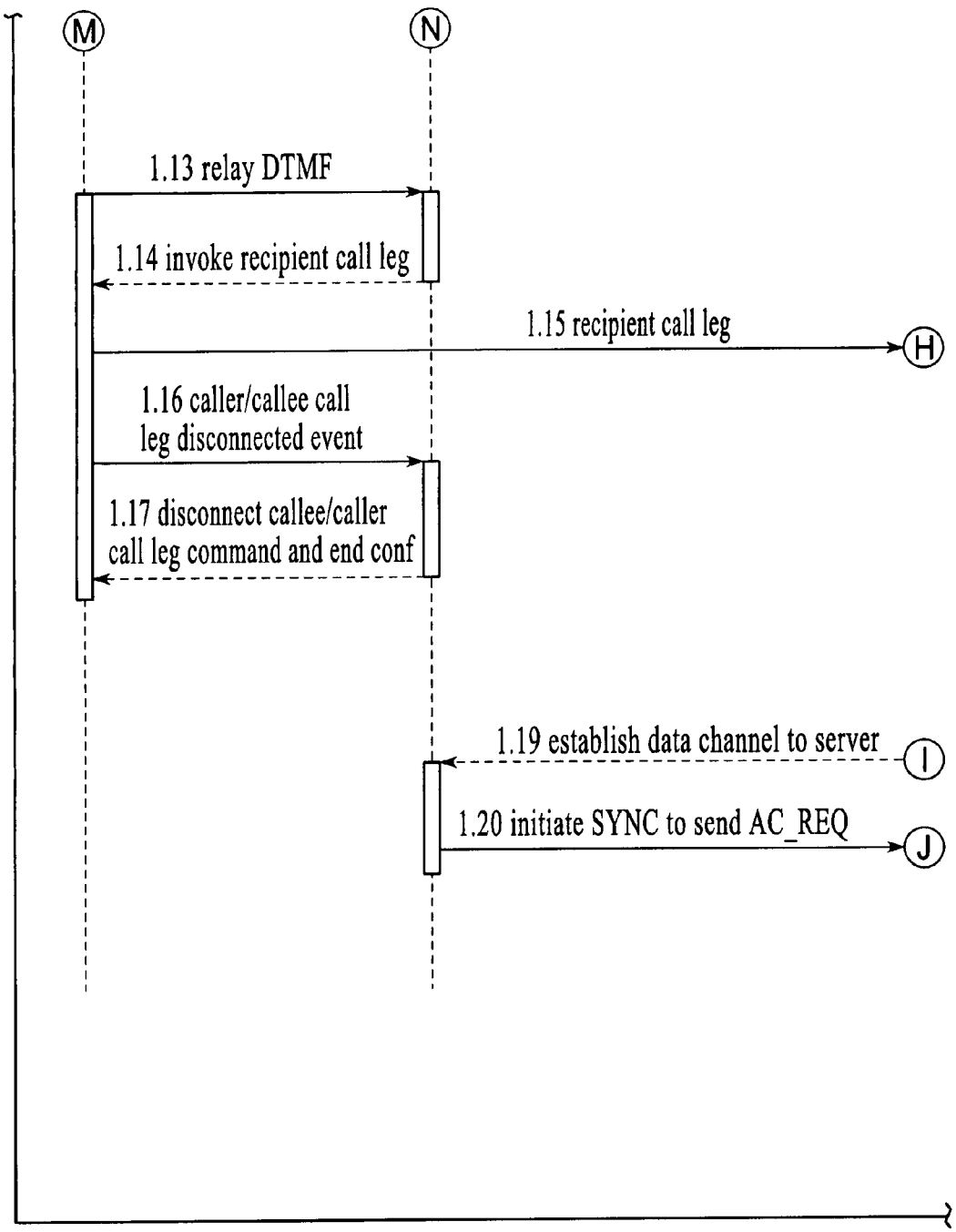
FIG.9/4

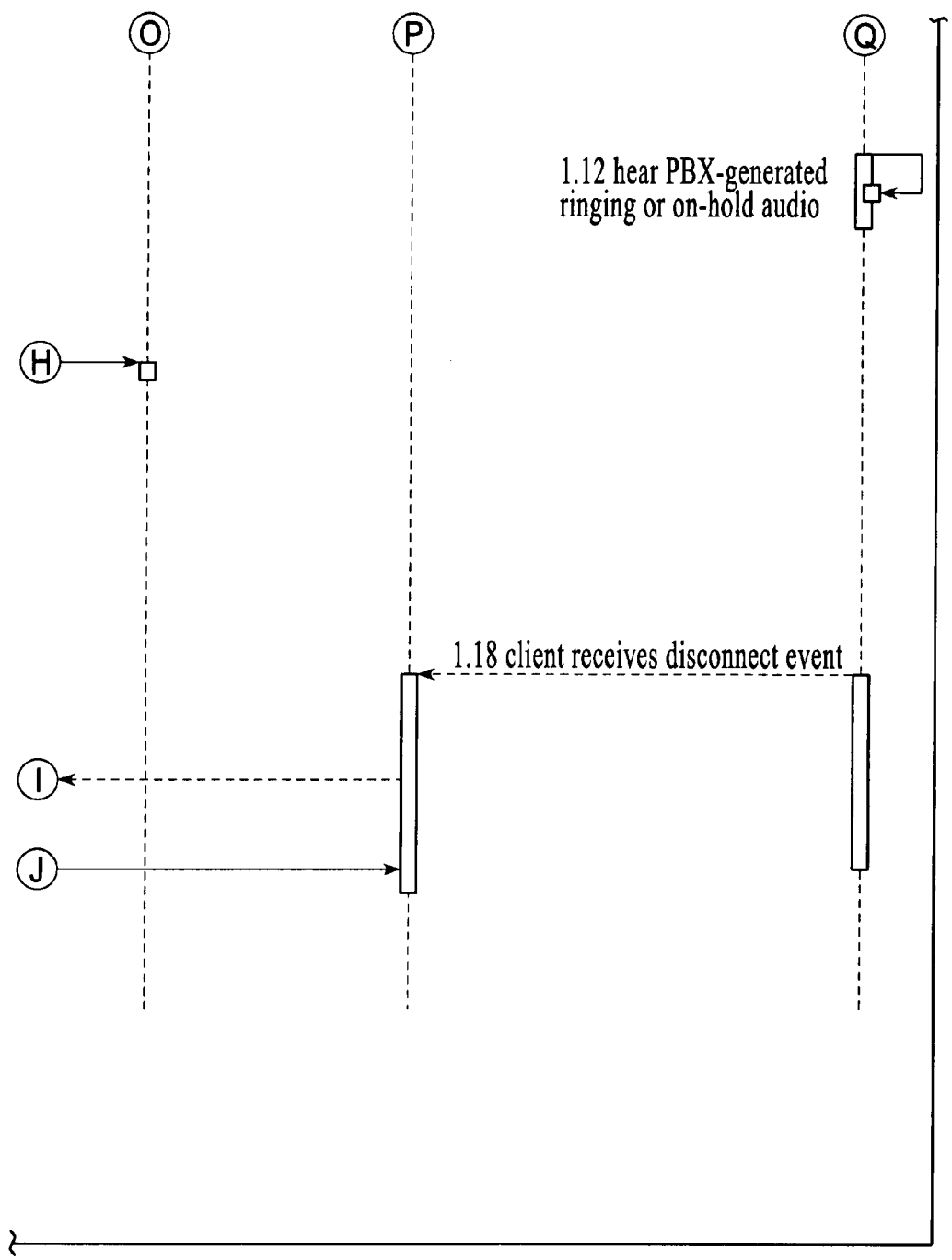
FIG.9/5

MOBILE DEVICE CALLS VIA PRIVATE BRANCH EXCHANGE

RELATED APPLICATIONS

This application is a continuation-in-part (CIP) application of U.S. patent application Ser. No. 10/890,922, filed Jul. 14, 2004, which claims the benefit of U.S. Patent Application No. 60/487,143, filed Jul. 14, 2003.

This application claims the benefit of U.S. Patent Application No. 60/784,747, filed Mar. 21, 2006.

This application is related to U.S. patent application Ser. Nos. 11/509,109, 11/509,474, 11/509,113, 11/509,472, 11/509,127, 11/509,136, 11/509,144, and 11/509,494, all filed Aug. 23, 2006, and all of which claim the benefit of U.S. Patent Application Nos. 60/710,998, 60/711,051, and 60/711,053, all filed Aug. 23, 2005.

This application is related to U.S. patent application Ser. No. 11/651,223, filed Jan. 8, 2007, which claims the benefit of U.S. Patent Application No. 60/756,686, filed Jan. 6, 2006.

TECHNICAL FIELD

The disclosure herein relates generally to communication systems and, in particular, to wireless communication systems.

BACKGROUND

Mobile communications in today's real-time enterprise can be challenging. The problem is further complicated by changes in the workplace which have led to a more geographically dispersed and highly mobile workforce. In spite of the popularity of electronic mail (email), large numbers of people and employees still depend upon numerous other types of communications to collaborate with colleagues and drive business success. This is especially true for those in sales, service, operations and management roles who rely upon timely access to and coordination with colleagues as well as other employees, customers, partners and suppliers. Thus, communications remain an essential means of conducting business and staying in contact.

As a result of communications being so critical to business today, many professionals and enterprise employees now handle very large numbers of communications each business day. These communications can include disparate types of communications like emails, voicemails, instant messaging to name a few. Managing these large numbers and disparate types of communications consumes large amounts of time during the typical business day. For the growing number of people who spend a significant part of their day away from their offices or in meetings or other events, managing this large number of communications is highly time-consuming, frustrating and inefficient. Consequently, there is a need for communication systems that provide efficient, timely, and proactive real-time management of multiple types of communications.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

BRIEF DESCRIPTION OF THE DRAWINGS

FIG. 9 is a detailed call flow diagram for dial via PBX, under an embodiment.

DETAILED DESCRIPTION

Figure 1:
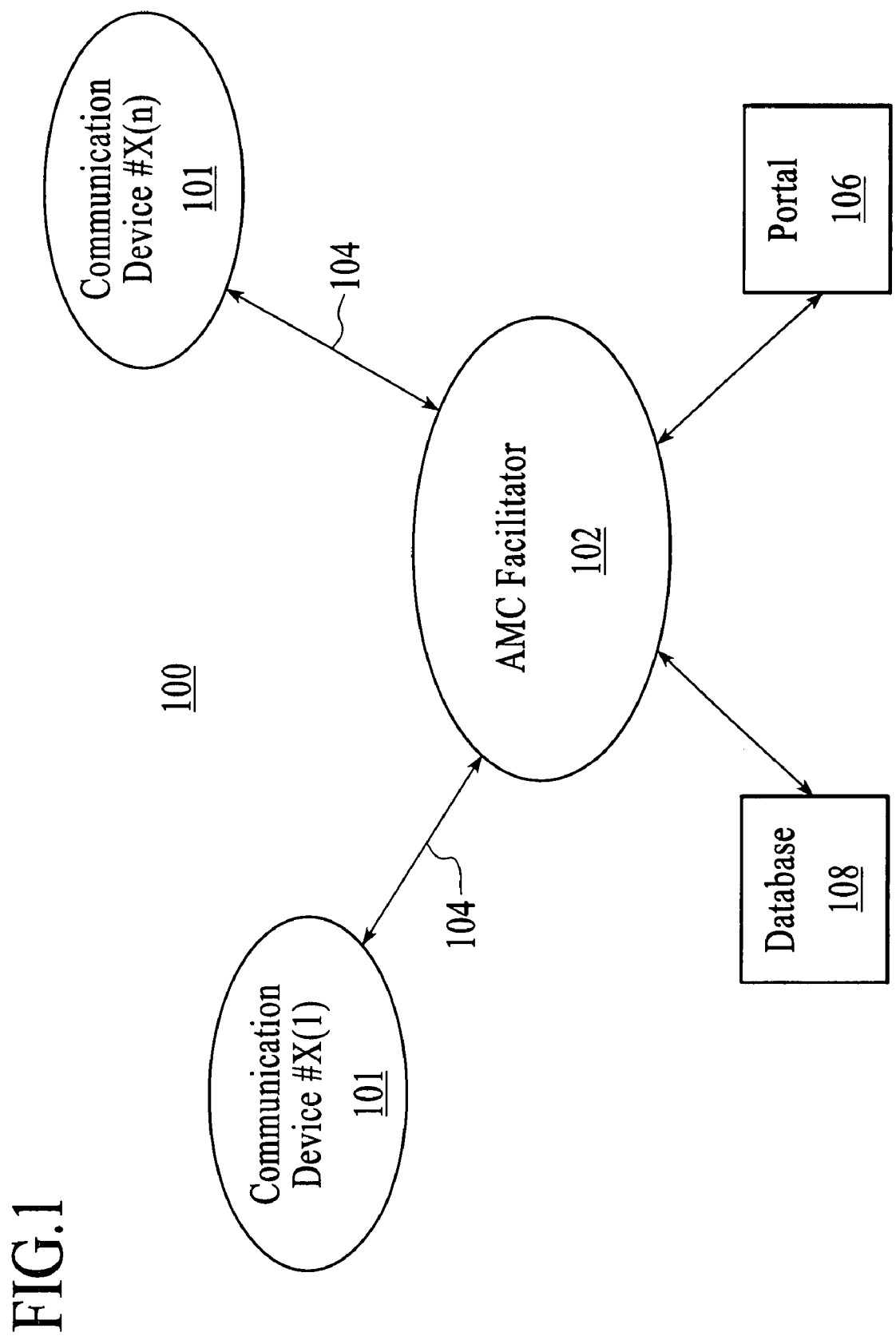
FIG. 1 is a block diagram of an active mobile collaboration (AMC) system, under an embodiment.

Communication systems and methods are described that enable mobile devices to route telephone calls via an enterprise telephone system. The communication systems and methods are referred to herein as "dial via PBX." The communication system is configured to receive via a data channel a request from the mobile device. The mobile device, which for example includes a cellular telephone, corresponds to a user making a call. The server receiving the request includes a private branch exchange (PBX) and one or more other servers hosted by or coupled to the enterprise. A first call leg is initiated over a first voice channel in response to the request. The first call leg is coupled to the server and mobile device. A second call leg is initiated over a second voice channel, and the second call leg is coupled to the server and a client device corresponding to an intended call recipient. The client device includes, for example, a telephone or other communication device coupled to a communication network and accessible via a telephone number. A voice conference call is formed between the mobile device and client device by joining the first and second call legs. The voice channel and/or the data channel as described herein is hosted by an enterprise, a service provider, and/or a mobile network operator.

The dial via PBX of an embodiment reduces costs of telephone calls (e.g., long distance, international, etc.) made from mobile devices like cellular telephones by leveraging an enterprise telephone system. To reduce costs, AMC users may route long distance and/or international telephone calls made from their mobile devices via the enterprise PBX with which the users are associated. This telephone call routing via the enterprise PBX, enables a user to leverage the PBX to bypass international toll charges from the cellular telephone. The dial via PBX thus reduces the cost of telephone usage by using the data channel of the mobile device for signaling while using the cellular voice channel for audio. The client and facilitator of the AMC system are configured to couple with the enterprise PBX to provide the dial via PBX functionality as described in detail below.

The dial via PBX, by allowing users to make telephone calls using an enterprise PBX infrastructure, allows users and enterprises to reduce costs by leveraging the enterprise voice gateways and wide are network (WAN) trunks. Furthermore, the user can dial telephone calls using short code dialing (e.g., dialing only an extension number).

Additionally, the dial via PBX provides the user with the ability to hide his/her personal caller identification (ID) because the calls initiated via the enterprise PBX infrastructure carry the caller ID of the PBX.

In the following description, numerous specific details are introduced to provide a thorough understanding of, and enabling description for, embodiments of the communications systems. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

The communication systems described herein use loosely-coupled client-server architectures to improve the efficiency of multiple types of communications. The communication systems, referred to herein as the active mobile collaboration (AMC) system, include a client application and a facilitator application. The client application, also referred to as the client or AMC client, is a component application of a variety of processor-based mobile communication devices and telephones.

The facilitator application of an embodiment, also referred to as the facilitator or AMC facilitator, is an application hosted on one or more servers or other processor-based devices. The facilitator communicates with a portable or mobile communications device via one or more couplings and the client hosted on the communications device. The facilitator communicates with the AMC client of a host portable device via a network coupling for example. The facilitator of alternative embodiments can be distributed among one or more portable processor-based devices including the same communication devices as the client application.

The components of the AMC system function to improve efficiency of communications by allowing communication device users to increase accessibility of enterprise and personal contact information from mobile phones and other personal digital assistants (PDAs), as well as enabling users to leverage their enterprise telephone system (e.g., enterprise PBX) by routing telephone calls from their mobile devices through their enterprise PBX in order to bypass long distance toll charges to the cellular telephone. Furthermore, the AMC systems allows users to dynamically manage how and when mobile communications take place, intelligently screen messages, regardless of message type, based on identity of a messaging party, urgency, and subject matter, and determine which contacts in a directory are available to talk and which ones choose not to be disturbed, to name a few.

FIG. 1 is a block diagram of an active mobile collaboration (AMC) system 100, under an embodiment. The AMC system 100 includes any number X(n) of communication devices 101 coupled for communication via one or more facilitators 102 and one or more couplings 104. One or more of the communication devices 101 include an AMC client application. Likewise, the facilitator 102, also referred to herein as the AMC server 102, includes a facilitator application. The AMC client and facilitator function to allow users of the communication devices to dynamically manage how, when, and with whom mobile calls take place, intelligently screen calls based on caller identity, urgency, and subject matter, determine which contacts in a directory are available to talk and which ones choose not to be disturbed, and increase accessibility of enterprise and personal information (e.g., voicemail, contacts, calendars, etc.) from mobile phones. The AMC system 100 of an embodiment also includes couplings with one or more portals 106 and/or one or more databases 108, but is not so limited.

The communication devices 101 and facilitators 102 described herein are processor-based components running or hosting numerous applications or programs. As such, the communication devices 101 and facilitators 102 can include one or more processors (not shown) coupled among any number/combination of components (not shown) known in the art, for example buses, controllers, memory devices, and data input/output (I/O) devices, in any number of combinations.

The communication devices 101 described herein include processor-based electronic devices, for example, cellular telephones, personal computers, portable computing devices, portable telephones, non-portable telephones, portable communication devices, subscriber devices or units, PDAs, mobile devices, wireless devices, wireline devices, voice over Internet Protocol (VOIP) devices, private branch exchange (PBX) devices, soft clients, desktop clients, telephones coupled to an enterprise telephone system, and telephones coupled to a central exchange (centrex) that provides telephone services to an enterprise, to name a few. The communication devices 101, also referred to as target devices, handsets, client devices, mobile devices, mobile communication devices, and portable communication devices, can include all such devices and equivalents, and are not limited to the communication devices described above.

As described above, the AMC clients are hosted on or run on communication devices 101 or handsets. The AMC client is an application that runs under control of processors on a variety of off-the-shelf mobile devices and telephones, for example, supporting open application environments such as the Symbian OS™, QUALCOMM's Binary Runtime Environment for Wireless (BREW™), as well as other application environments available from Palm, Microsoft, and Sun Microsystems, but is not so limited. Users or subscribers can download and deploy the AMC client over the air and/or over wired connections; further, the AMC client can be pre-loaded in the memory of the host device, or displayed as a thin client (e.g., browser or web client).

The couplings 104 include wired couplings, wireless couplings, and hybrid wired/wireless couplings, but are not so limited. Furthermore, the couplings 104 can include various networks and/or network components (not shown) of a communication service provider or carrier, but are not so limited. The network and corresponding network components, when present in the couplings 104, can be any of a number of network types known in the art including, but not limited to, local area networks (LANs), metropolitan area networks (MANs), wide area networks (WANs), proprietary networks, backend networks, and the Internet. The coupling may be via a number of protocols including but not limited to Hypertext Transport Protocol (HTTP), Transmission Control Protocol (TCP), User Datagram Protocol (UDP), Session Initiation Protocol (SIP), and Wireless Application Protocol (WAP). Furthermore, the coupling may be via a number of messaging standards including but not limited to Multimedia Messaging Service (MMS), Short Message Service (SMS), and Enhanced Messaging Service (EMS).

Figure 2:
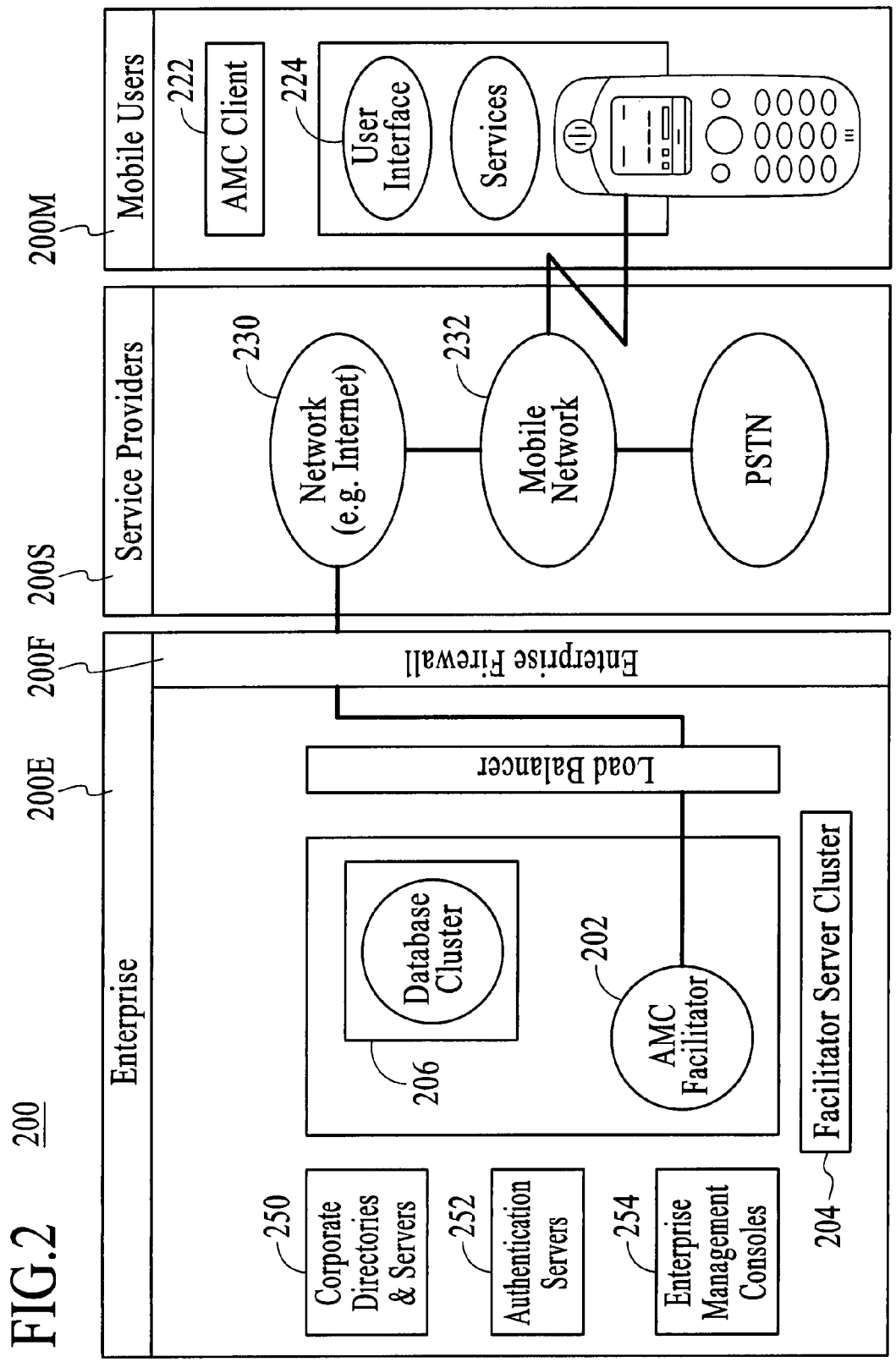
FIG. 2 is a block diagram of a communications system that includes an AMC system, under an alternative embodiment.

FIG. 2 is a block diagram of a communications system 200 that includes an AMC system, under an embodiment. The AMC system includes a facilitator 202 and a client 222 as described elsewhere herein. The facilitator 202 can be one or more facilitators that form a facilitator server cluster 204 and/or database cluster 206 within the enterprise 200E that are resident behind the enterprise firewall 200F, but the AMC system is not so limited. The host enterprise 200E also includes numerous other components, for example, corporate directories and servers 250, authentication servers 252, and enterprise management consoles 254 to name a few. The facilitator 202 is an integrated component of the host enterprise 200E and as such integrates with one or more components of the enterprise 200E. For example, couplings between the facilitator 202 and messaging and collaboration servers (e.g. Microsoft® Exchange) and/or corporate or other directories of the enterprise 200E allow easy, over-the-air download of personal and corporate contact information to devices, as well as searching of personal and corporate contact directories from the device. Other information of the enterprise 200E can also be delivered to the devices using the AMC system, information including but not limited to calendar information, calendar alerts, calendar reminders, etc.

The facilitator 202 couples to a client device or device of one or more users via one or more network couplings. The facilitator 202 couples to one or more devices using one or more service provider networks 200S, as an example. In this example configuration, the facilitator 202 couples to one or more service provider networks or infrastructures 200S via network couplings 230 (e.g. Internet), and then couples to devices 200M via the respective service provider networks 232. The AMC system protects data transfers between the facilitators 202 and the devices 200M using secure couplings, for example, protected with end-to-end security protocols like Secure Sockets Layer (SSL) or Transport Layer Security TLS cryptographic protocols.

The devices 200M of an embodiment include the AMC client 222. The AMC client 222, also referred to as the client 222, includes a graphical user interface 224 that integrates with the device applications and allows users to receive and scan enterprise information of the enterprise 200E. The enterprise information includes voicemail information (e.g., voicemail messages), contact information, directory information, calendar information, alerts that can include calendar reminders, conference notifications and call requests from colleagues, as described herein and in the Related Applications. Call requests include relevant details such as name, urgency, and subject matter to help users move business forward while screening out unwanted interruptions. The client 222 further provides a presence-aware phonebook that lets users find a contact and determine if the contact is available to talk, even before placing a call. The client 222 eliminates the need to manually enter contacts into the host device 200M. Instead, users download personal and/or corporate contact information over-the-air to their devices. The facilitator 202 and client 222 of the AMC system therefore provide automated, two-way synchronization to ensure contacts are backed up and up to date at the enterprise 200E.

An example of the AMC system of an embodiment is available as the Orative Enterprise Software from Orative Corporation of San Jose, Calif. The facilitator is available as the Orative Enterprise Server (e.g. runs on a standards-based, Java 2, Enterprise Edition (J2EE) platform that operates securely behind the enterprise firewall). The client is available as the Orative Client Software (e.g. runs on a variety of popular mobile devices, and leverages the latest application development environments including Symbian OS, Java and BREW to name a few).

Components of the AMC system generally include intra-domain and inter-domain routers. These routers serve to route messages between AMC clients and facilitators, between different facilitators, or a specific functional module within a facilitator. The routers operate in an incoming mode and an outgoing mode. In the incoming mode (caller is the client interface layer) the routers receive commands from AMC clients and route them to a functional module based on the message type. In the incoming mode therefore the router acts like a simple router; it examines the message type and routes it to the appropriate functional module of a facilitator.

In the outgoing mode (caller is a server functional module) the routers receive outgoing commands and route them to either an AMC device, to another facilitator within the domain, or to another domain. The router uses the target username/domain pair of the message to determine the target server where: if the target domain is the same as its facilitator's domain, the router looks up the home facilitator of the target in a (database) table and assigns this value as the destination facilitator; and if the target domain is different from its facilitator's domain, the router assigns the value "amc.<domain name>" as the name of the destination facilitator.

There is always a destination facilitator for a message, even if the session of the message's target user has expired. The message is always routed to the user's home facilitator. If the home facilitator has failed, the message is instead routed to the user's backup facilitator. The assumption is that foreign domains don't have a single point of failure and can always receive the message.

If the destination facilitator is the originating facilitator, this indicates the message needs to be routed to one or more destination clients. The set of active destination devices for this user is found in a database table map (key is username and active flag; value is a set of destination device unique identifiers). A device is uniquely identified by a device ID and DNS name/Internet Protocol (IP) address and port pair or phone number and carrier pair. The message is then placed in the user's queue and the rate controller per each active destination device is notified of the event.

In case of facilitator-to-facilitator routing, the message is placed in the facilitator's queue and the target facilitator's rate controller is signaled with the event. Facilitator-to-domain routing is identical to facilitator-to-facilitator routing.

Authentication ascertains the user identity for AMC client-facilitator and portal-facilitator communications and the server identity for facilitator-facilitator communication. User authentication of an embodiment is performed via an API of the facilitator, where the API supports many forms of authentication including basic username/password mechanisms to more complex challenge/response mechanisms, but the embodiment is not so limited.

While dynamically managing how and when mobile calls take place and intelligently screening calls based on numerous factors described above, the components of the AMC system also improve efficiency of voice communications by increasing accessibility of enterprise and personal contact information from mobile phones. Components of the AMC system of an embodiment support aggregation and management of contact information from various sources including, but not limited to, directories resident on desktop computers, corporate/enterprise directories, and contact information of the mobile device native phonebook, and provide data coupling between those sources and mobile devices hosting the AMC client, as described herein and in the Related Applications. This contact information is managed by providing the user with access via the mobile device to dynamically integrated contacts of a contact list and a number of phonebooks from multiple sources. The dynamic integration of multiple disparate directories provided by the AMC system of an embodiment allows a user to indicate the contacts he/she desires among all directories of a corresponding enterprise server, and then dynamically synchronizes all enterprise directories so as to place the desired information from the directories together into a common AMC phonebook. The integrated contact information available to the user is used in generating and routing call requests of the call notification described in detail below.

Figure 3:
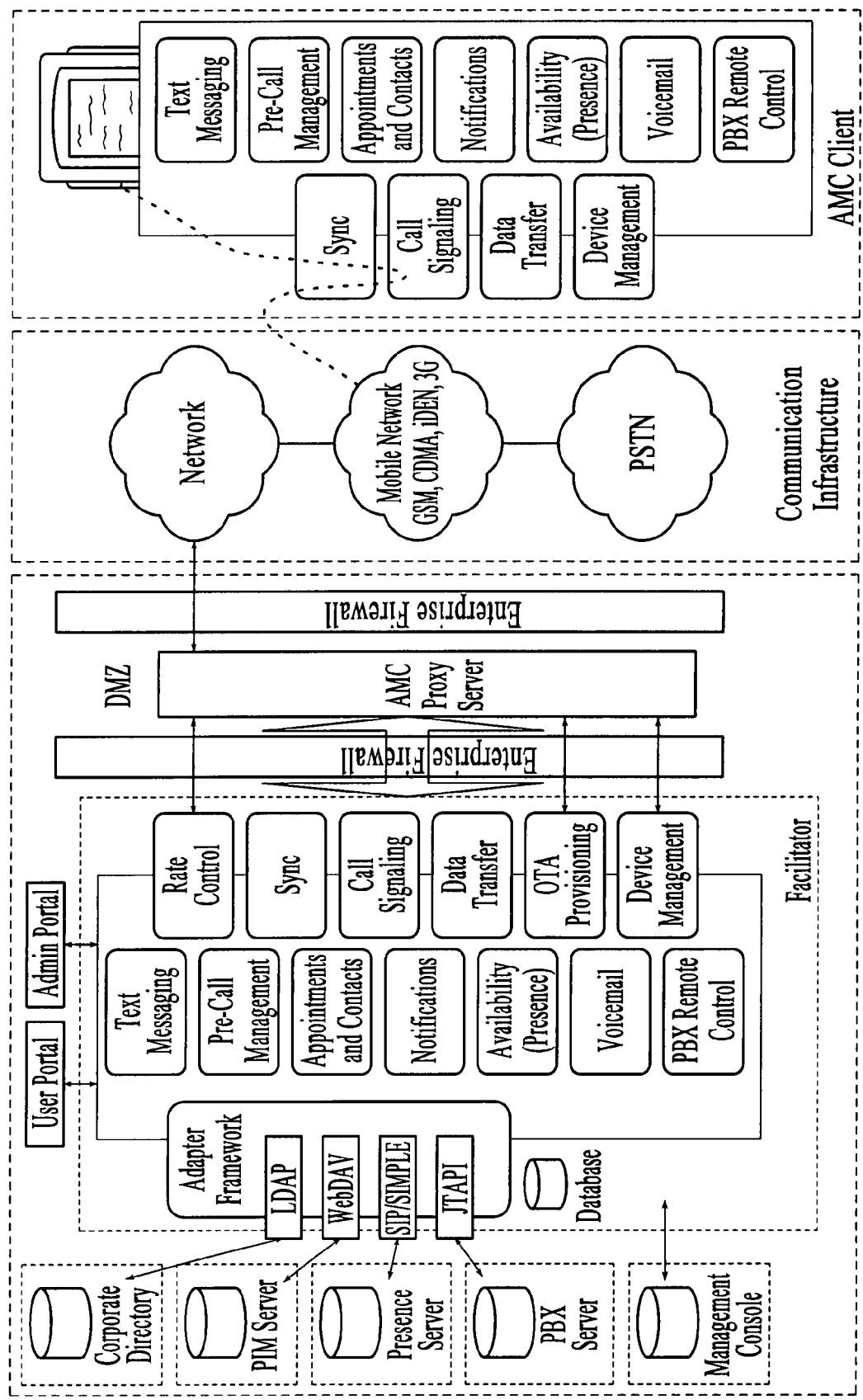
FIG. 3 is a block diagram of a communications system that includes an AMC system, under another alternative embodiment.

FIG. 3 is a block diagram of a communications system 300 that includes an AMC system, under an embodiment. The communications system 300 includes enterprise components, with which the AMC system is integrated, coupled to client devices via a communication or network infrastructure. The enterprise components include, but are not limited to, one or more of a corporate directory, Personal Information Manager (PIM) server, presence server, Private Branch Exchange (PBX) server, management console, and voicemail system (e.g., voicemail servers), to name a few.

The AMC system includes a facilitator as described herein. The facilitator includes an adapter or adapter framework by which the facilitator simultaneously integrates with components of the enterprise and enterprise servers. The facilitator uses an adapter for each enterprise component to which it integrates. The adapter of an embodiment is a protocol-specific adapter for each enterprise component to which it integrates; alternatively, the adapter includes vendor-specific adapters. The facilitator integrates with multiple components simultaneously. The AMC adapters convert the data from the enterprise components (e.g. external) into a common data structure.

The facilitator includes one or more applications that support multiple functions provided by the AMC system. The AMC system functions include integrated access to enterprise voicemail as described here and, additionally, text messaging, pre-call management, appointments and contacts, notifications, availability (presence), voicemail, and PBX remote control as described herein and in the Related Applications.

The facilitator couples to a client device of one or more users via one or more network couplings or infrastructures. As an example, the facilitator couples to a mobile network using a coupling with another communications network (e.g. Internet). The mobile network or mobile infrastructure, which includes one or more service provider networks associated with respective ones of the client devices, provides a coupling to individual client devices.

Communications between the facilitator and the client device are controlled by the facilitator using one or more components and applications. The functions provided by the facilitator in controlling communications include one or more of rate control, synchronization (sync), call signaling, data transfer, over the air (OTA) provisioning, and device management to name a few. Optionally, the communications path between the facilitator and the communications network includes an AMC proxy server.

A protocol used between the client and the facilitator can be different from protocols used between other components of the AMC system and/or enterprise. More particularly, the protocol used between the client and the facilitator may not be the same as the protocol used between facilitator and PBX server. For example, the client to facilitator protocol may include session initiation protocol (SIP) or sync messages, while the facilitator to PBX protocol may include SIP, HTTP, or web services in which the facilitator acts as gateway.

As described above, AMC users may route telephone calls made from their mobile devices via the enterprise PBX with which the users are associated. This telephone call routing under the dial via PBX of an embodiment enables users to leverage the PBX to bypass international toll charges to their cellular telephones. The client and facilitator of the AMC system are configured to couple with the enterprise PBX to provide the dial via PBX functionality as described in detail below.

In the descriptions herein, the mobile device corresponds to a caller initiating or originating a call. Furthermore, a client device reachable via a telephone number corresponds to an intended recipient or recipient of the call.

Figure 4:
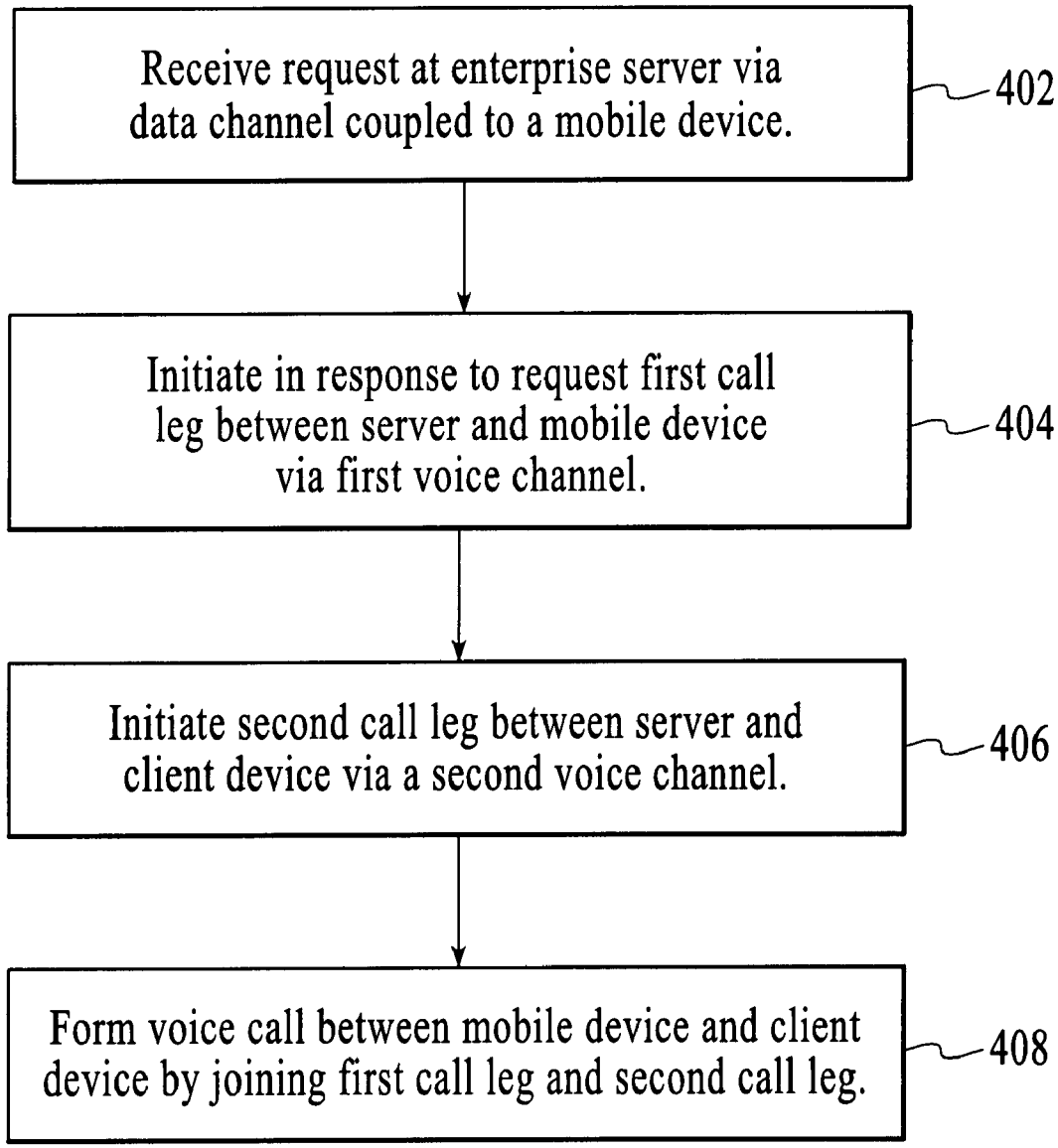
FIG. 4 is a flow diagram for dial via PBX, under an embodiment.

Generally, FIG. 4 is a flow diagram for dial via PBX 400, under an embodiment. The mobile device under the dial via PBX 400 first sends a dial-via-PBX request via a data channel, and the dial-via-PBX request is received 402 at a server of the enterprise. The mobile device corresponds to a caller attempting to reach an intended call recipient. The server can be a component of the enterprise and/or coupled to the enterprise. For example, the server includes one or more of the facilitator and a PBX server (alternatively referred to as a telephone server) hosted by the enterprise with which the caller is affiliated. A first call leg is initiated 404 between the server, on behalf of the user from his enterprise landline telephone number, and the mobile device and its telephone number in response to the request. The first call leg includes an outbound call leg from the mobile device to the server or an outbound call leg from the server to the mobile device, as described in detail below. A first voice channel hosts the first call leg. A second call leg is initiated 406 between the server, on behalf of the user from his enterprise landline telephone number, and the recipient's client device or telephone in response to the request, and a second voice channel hosts the second call leg. The telephone corresponds to the intended call recipient. The server forms 408 a voice call between the mobile device (caller) and the telephone (call recipient) by joining the first call leg and the second call leg.

The AMC system of an embodiment provides dial via PBX through use of a "forward" dial via PBX that includes an outbound call leg from the mobile device of the call originator to the PBX. The call recipient is connected using an outbound call leg from the PBX to the recipient's telephone line. The forward dial via PBX provides a more natural user experience but may not be optimal if the call originator is roaming or if the call from the mobile device to the PBX is expensive and can be reduced via toll bypass options.

Figure 5:
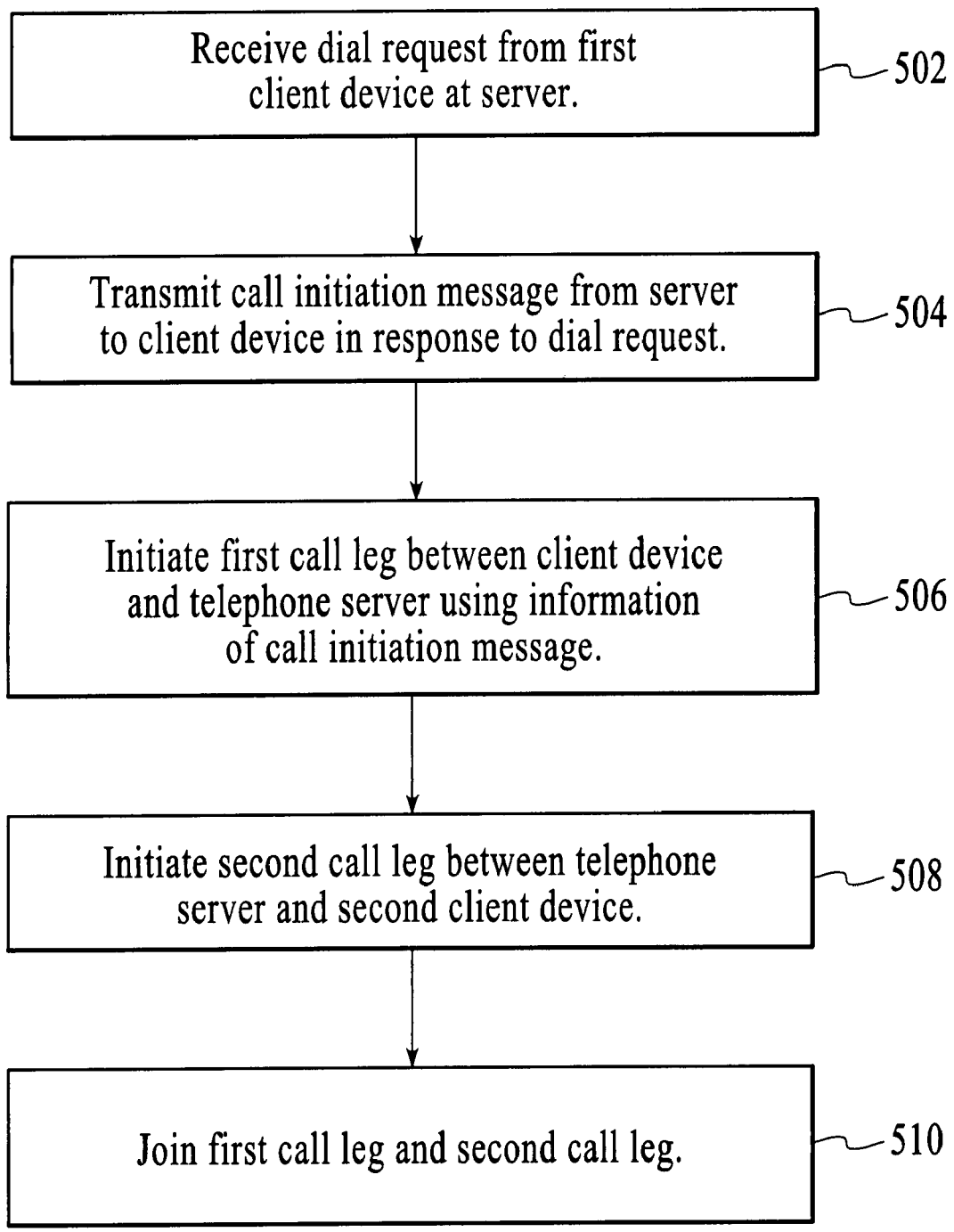
FIG. 5 is a flow diagram for forward dial via PBX, under an embodiment.

FIG. 5 is a flow diagram for forward dial via PBX 500, under an embodiment. The AMC client of the mobile device under the forward dial via PBX 500 initiates the transfer or transmittal of a dial-via-PBX request via a data channel, and the dial-via-PBX request is received 502 at the facilitator. The facilitator responds to the request by transmitting 504 a call initiation message to the client of the requesting mobile device. The call initiation message includes a transaction ID and a call-in telephone number but is not so limited. The call-in telephone number is a telephone number by which the mobile device can establish a telephone connection with the PBX. The client is configured to control the mobile device to automatically initiate 506 a first call leg with the PBX by dialing the call-in telephone number received from the facilitator. The client is also configured to transmit the transaction ID to the PBX using, for example, an in-band DTMF sequence. The PBX is configured, in response to the transaction ID received from the mobile device, to initiate 508 a second call leg to the intended call recipient, and join 510 the second call leg to the call recipient with the first call leg from the mobile device. Alternatively, the facilitator may generate a unique number to call for each transaction (at least within a time period) and therefore not require the mobile device to transmit the transaction ID to the PBX, or only require a shorter transaction ID.

Figure 6:
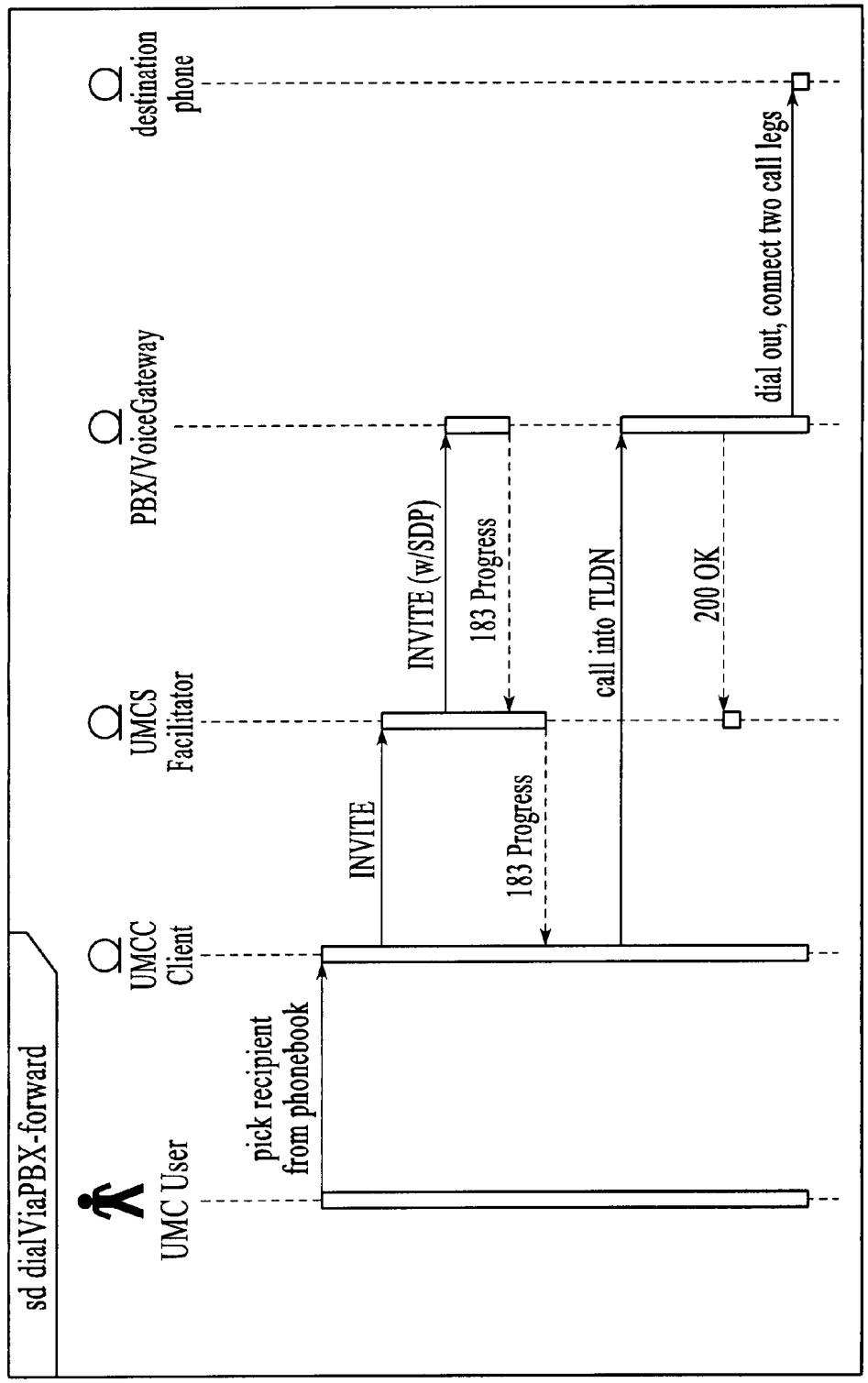
FIG. 6 is a call flow diagram for forward dial via PBX, under an embodiment.

FIG. 6 is a call flow diagram for forward dial via PBX 600, under an embodiment. This call flow 600 is presented as an example call flow 600 and does not limit the forward dial via PBX described herein to only this call flow 600. Using a client, the user of a mobile device selects an intended call recipient from a phonebook, The client initiates the forward dial via PBX call flow 600 by generating and sending a dial-via-PBX request or invitation message (e.g., INVITE) to the corresponding facilitator via a data channel. The request message includes contact information of the intended call recipient but is not so limited.

The facilitator generates and transmits a call initiation instruction (e.g., INVITE (w/SDP) to a PBX hosted by the enterprise. The facilitator also responds to the client request by transmitting a call initiation message (e.g., 183 Progress) to the requesting mobile device. The call initiation message includes a transaction ID and a call-in telephone number (e.g., a TLDN) but is not so limited. The facilitator of an embodiment provides an optional response message to the client to supply rich identification information (e.g., rich caller ID as described herein) for the intended call recipient.

The call-in telephone number is a telephone number by which the mobile device can establish a telephone connection with the PBX during the forward dial via PBX. The call-in telephone number is provided to the facilitator by the PBX in an embodiment, but the embodiment is not so limited as one or more other components of the AMC system and/or host enterprise can provide the call-in telephone number.

The client of the mobile device initiating the call is configured to automatically initiate a first call leg via a voice channel with the PBX (e.g., call into TLDN) by controlling the mobile device to dial the call-in telephone number received from the facilitator. Once connected with the PBX the client is configured to control the mobile device to transmit the transaction ID to the PBX using, for example, a DTMF tone or sequence. The PBX is configured, in response to receipt or detection of the transaction ID received from the mobile device, to initiate a second outbound call leg to the intended call recipient. Once the PBX establishes the second outbound call leg with the destination telephone number, the PBX joins the first and second outbound call legs into a conference call (e.g., dial out to recipient, connect call legs together).

In one embodiment, to ensure that the second outbound call leg to the call recipient does not get answered by a voicemail machine, the second outbound call leg is considered successful only if the call recipient responds with a DTMF signal upon answering the call. When the recipient answers the call, for example, the facilitator plays a prompt (e.g., "Jane Doe wants to talk with John Smith. Please press 1 if you are John Smith and would like to accept the call"). If the DTMF is not received from the client device of the call recipient within a time period, the second outbound call leg is dropped and the caller is informed that the intended call recipient corresponding to the dropped call leg could not be reached.

The AMC system of an alternative embodiment provides dial via PBX through use of a "reverse" dial via PBX that includes an inbound call leg from the PBX to the mobile device of the call originator. The call recipient is connected using an outbound call leg from the PBX to the client device of the call recipient. The reverse dial via PBX may be preferred when the PBX-initiated call to the mobile device is relatively cheaper than a call originated at the mobile device to the PBX (forward dial via PBX).

Figure 7:
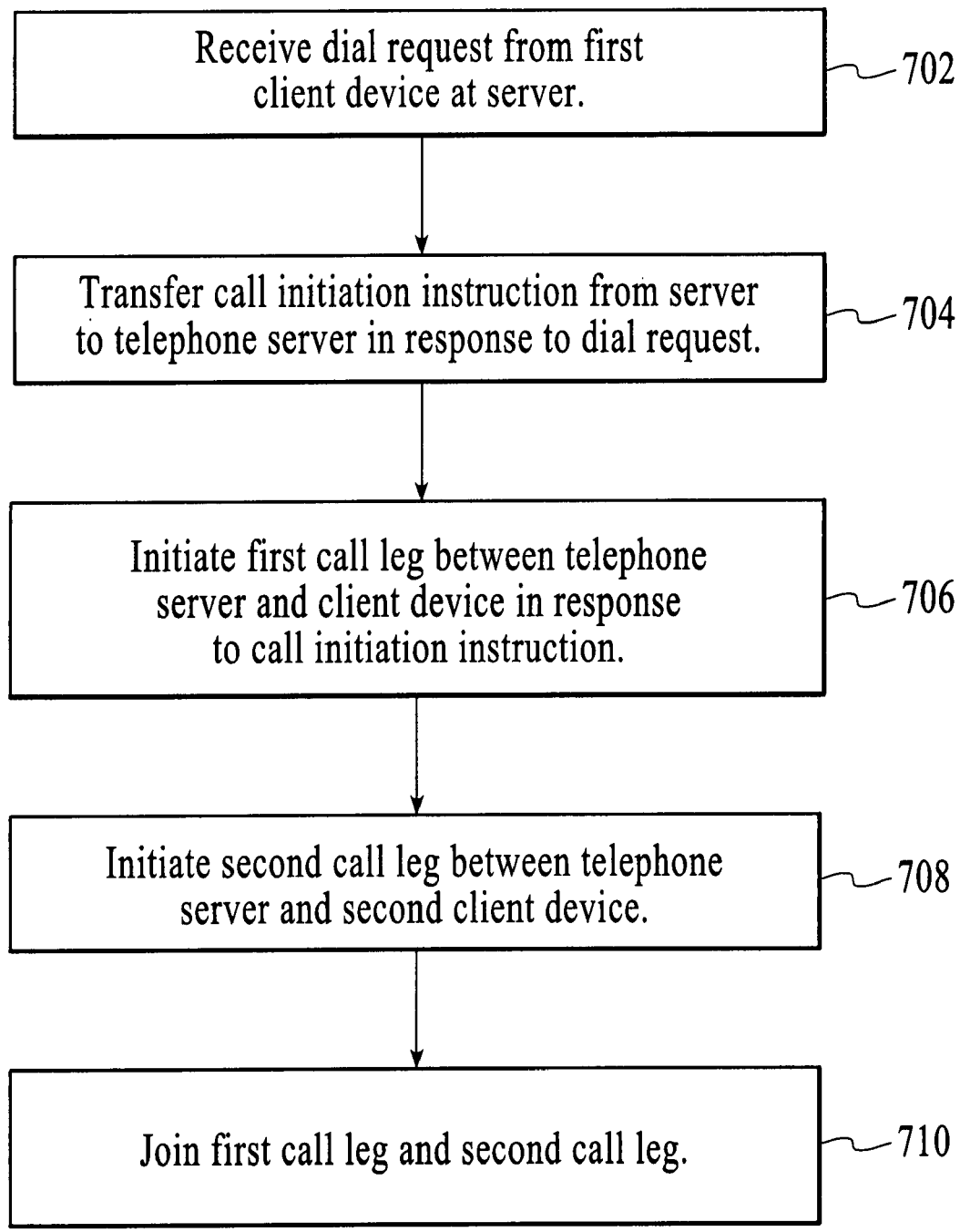
FIG. 7 is a flow diagram for reverse dial via PBX, under an embodiment.

FIG. 7 is a flow diagram for reverse dial via PBX 700, under an embodiment. The AMC client of the mobile device under the reverse dial via PBX 700 initiates transfer or transmittal of a dial-via-PBX request via a data channel, and the dial-via-PBX request is received 702 at the facilitator. The facilitator generates 704 and transmits to a PBX a call initiation instruction in response to the dial-via-PBX request. The PBX is configured to automatically initiate 706 a first call leg with the mobile device in response to the call initiation instruction. The client of the caller's mobile device is configured to automatically answer the call from the PBX. To determine that the first call leg from the PBX was answered by the mobile device and not sent to the mobile device voicemail, in one embodiment, the client controls the mobile device of an embodiment to transmit a DTMF sequence to the PBX when the client answers the call. If the PBX does not receive the DTMF sequence within a given time frame, the PBX is configured to assume the call went to the mobile device voicemail and to re-attempt the call leg to the mobile device. The PBX is instructed, in response to the mobile device answering the call, to initiate 708 a second call leg to the intended call recipient, and to join 710 the second call leg to the call recipient with the first call leg to the mobile device.

Figure 8:
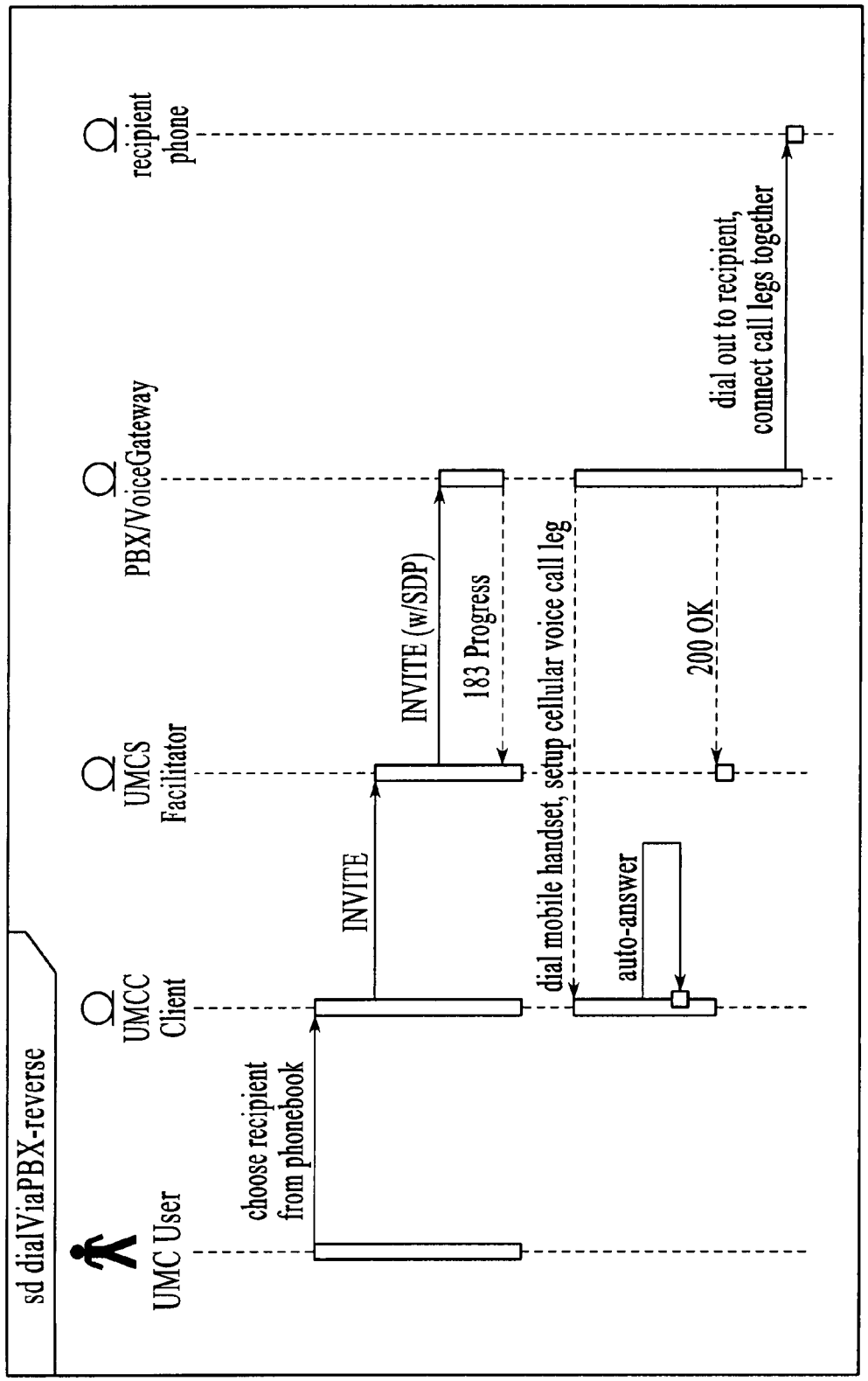
FIG. 8 is a call flow diagram for reverse dial via PBX, under an embodiment.

FIG. 8 is a call flow diagram for reverse dial via PBX 800, under an embodiment. This call flow 800 is presented as an example call flow 800 and does not limit the reverse dial via PBX described herein to only this call flow 800. The user of a mobile device selects an intended call recipient from a phonebook, and information of the intended call recipient is provided to the client hosted on the mobile device. The client initiates the reverse dial via PBX call flow 800 by generating and sending a dial-via-PBX request or invitation message (e.g., INVITE) to the corresponding facilitator via a data channel. The request message includes contact information of the intended call recipient but is not so limited.

The facilitator generates and transmits a call initiation instruction (e.g., INVITE) to a PBX hosted by the enterprise. The facilitator of an embodiment is configured to act as a gateway that translates protocols between the client or client device and the PBX or other communication system or network. Thus, the facilitator of an embodiment is configured to relay or transfer the message from the client and, additionally, to change or modify the message before or during the transfer. In one example, the INVITE from the client does not include a Session Description Protocol (SDP) but the message from the facilitator to the PBX does include the SDP. In another example, the message from the client to the facilitator may be a call request that is synchronized but the message between the facilitator and the PBX may be SIP or JTAPI.

The call initiation instruction, generated in response to the dial-via-PBX request from the client, instructs the PBX to create a first outbound call leg with the requesting mobile device hosting the client via a landline number of the enterprise and a voice channel of the mobile device. The PBX is configured to automatically initiate the first outbound call leg (e.g., dial mobile handset, setup cellular voice cal leg) with the mobile device of the call initiator in response to the call initiation instruction.

The client of an embodiment is configured to automatically answer (e.g., auto-answer) the call from the PBX; alternatively, the user can manually answer the incoming call. The PBX is instructed, in response to detecting that the mobile device has answered the call, to initiate a second outbound call leg to the intended call recipient. Once the PBX establishes the second outbound call leg with the destination telephone number, the PBX joins the first and second outbound call legs into a conference call (e.g., dial out to recipient, connect call legs together).

More specifically, FIG. 9 is a detailed call flow diagram for dial via PBX 900, under an embodiment. This call flow 900 is presented as an example call flow 900 and does not limit the dial via PBX described herein to only this call flow 900. The client hosted on a mobile device initiates the dial via PBX call flow 900 by generating and sending a dial-via-PBX request or invitation message (e.g., 1.1 INVITE) to the corresponding facilitator via a data channel. A field of the request message includes a valid destination telephone URL but is not so limited. The facilitator responds to the client with an optional message (e.g., 1.2 UPDATE) to supply rich identification information (e.g., rich caller ID as described herein) for the intended call recipient. The facilitator returns a response to the client indicating that the invitation was correct (e.g., 1.3 OK), and the client returns an acknowledgment message (e.g., 1.4 ACK). Alternatively, the facilitator returns a response to the client indicating the invitation was malformed (e.g., 1.3 Bad Request). The client initiates play of an audible feedback message for the user of the mobile device hosting the client (e.g., 1.5 play audio for feedback) when the client receives the message from the facilitator indicating that the invitation was correct (e.g., 1.3 OK).

The facilitator generates and transmits a call initiation instruction (e.g., 1.6 invoke caller call leg) to a PBX hosted by the enterprise. The call initiation instruction, generated in response to the dial-via-PBX request from the client, instructs the PBX to create an outbound call leg between a landline number of the enterprise and a voice channel of the mobile device hosting the client. The enterprise landline number of an embodiment is a landline number corresponding to the user but is not so limited. The PBX is configured to automatically initiate the outbound call leg (e.g., 1.7 invoke caller cal leg) with the mobile device in response to the call initiation instruction. If the mobile device does not answer the outbound call from the PBX within a pre-specified period (as determined by the facilitator) or the line is busy, the facilitator disconnects the line and ends the dialog.

The mobile device generates a call event message (e.g., 1.8 call event) to the client in response to the call from the PBX. The client of an embodiment is configured to automatically answer (e.g., 1.9 auto-answer) the call from the PBX in response to the call event message. Alternatively, the user can manually answer the incoming call.

When the client is configured to automatically answer the incoming call from the PBX, and to ensure that the call from the PBX was initiated by the facilitator, the facilitator generates and sends a dual-tone multi-frequency (DTMF) tone or sequence to the client (e.g., 1.10 send "1" DTMF signal). The client of an embodiment disconnects the incoming call if it does not receive the DTMF tone or sequence within a pre-specified time period.

Furthermore, to determine that the outbound call leg from the PBX was answered by the client and not sent to the mobile device voicemail, the client of an embodiment signals the client device to generate and send a DTMF signal to the PBX (e.g., 1.11 send "2" DTMF signal) in response to the client answering the call. If the PBX does not receive the DTMF tone or sequence from the mobile device within a given time period, the facilitator is configured to assume the call went to the mobile device voicemail and to terminate the session. The facilitator of an embodiment is configured to subsequently initiate a re-attempt of the outbound call leg to the mobile device. Once the outbound call leg is established, the caller will hear an "on hold" indication (e.g., music, message, etc.) (e.g., 1.12 hear PBX-generated ringing or on-hold audio); when the caller is subsequently connected with the intended call recipient, the caller will hear the call ringing (or a busy signal).

The PBX is instructed, in response to the mobile device answering the call, to initiate a second call leg to the intended call recipient. Therefore, the PBX relays the DTMF signal received from the mobile device to the facilitator (e.g., 1.13 relay DTMF). When the facilitator receives a signal from the PBX (supplanted by the DTMF tone on certain devices), it instructs the PBX (e.g., invoke recipient call leg) to create an outbound call leg between an enterprise voice channel and the destination telephone number and join the two call legs into a conference call (e.g., 1.15 recipient call leg). If the outbound call leg to the destination telephone number cannot be created, the facilitator disconnects the outbound call leg to the mobile device and terminates the dial via PBX event.

The PBX generates and sends an event message to the facilitator when either the outbound call leg to the caller or the outbound call leg to the call recipient disconnects (e.g., 1.16 caller/callee call leg disconnected event). When the facilitator receives the disconnect event notice, the facilitator instructs the PBX to disconnect the other call leg and end the conference call (e.g., 1.17 disconnect callee/caller call leg command and end conf). In one embodiment, neither the facilitator nor the client is required to send an event completion or "BYE" message to the other in response to a disconnect event; instead the facilitator and the client implicitly generate a local BYE when each gets an event that the call has disconnected. Therefore, the facilitator receives a PBX call disconnect event from which it locally generates its BYE, and the client receives a device call termination event from which it locally generates its BYE.

As described above, the client receives a device call termination event (e.g., 1.18 client receives disconnect event) from which it generates locally an event completion message (e.g., BYE). The client of an embodiment, in response to generation of a local BYE, reconnects to the facilitator (e.g., 1.19 establish data channel to server). The facilitator generates a call log and synchronizes the call log to the client (e.g., 1.20 initiate SYNC to send AC_REQ).

The PBX may also be instructed by the facilitator, based on information sent from the mobile device, to initiate an outbound call leg not to the initiating mobile client but to another phone number (e.g., a hotel phone number). If this outbound call from the PBX to this alternative phone number is not answered within a pre-specified period (as determined by the facilitator) or the line is busy, the facilitator disconnects the line and ends the dialog. When this call is answered, the PBX creates a second call leg, as describe above, to the recipient's phone number and conferences in the two call legs. This enables the mobile client to act as a remote controller, via the data channel to the facilitator, to initiate a call between two phone numbers via the PBX. As in all cases, a call log is generated and transferred to the mobile client after the call is completed or after an error occurred.

The dial via PBX of an embodiment includes ad-hoc conferencing between a caller and numerous call recipients. The AMC user generally selects via his/her mobile device a group or set of call recipients. The mobile device sends a dial-via-PBX request to the facilitator with a list that includes the telephone numbers of all selected call recipients. Once the first call leg is initiated with the client device of the caller, the facilitator initiates a call leg for each recipient and then joins the caller and all recipients together into a conference call. The first call leg between the facilitator and the client device of the caller can be established under the forward dial via PBX or reverse dial via PBX as described herein.

To ensure that the call legs to each recipient of the group do not get answered by a voicemail machine, a call leg is considered successful only if the call recipient of a call leg responds with a DTMF signal upon answering the call. When the recipient answers the call, for example, the facilitator plays a prompt (e.g., "Jane Doe wants to talk with John Smith. Please press 1 if you are John Smith and would like to accept the call"). If the DTMF is not received from the client device of the call recipient within a time period, the call leg is dropped and the facilitator is informed that the intended call recipient corresponding to the dropped call leg could not be reached. The facilitator then conveys this information to the client device via the data channel.

Figure 10:
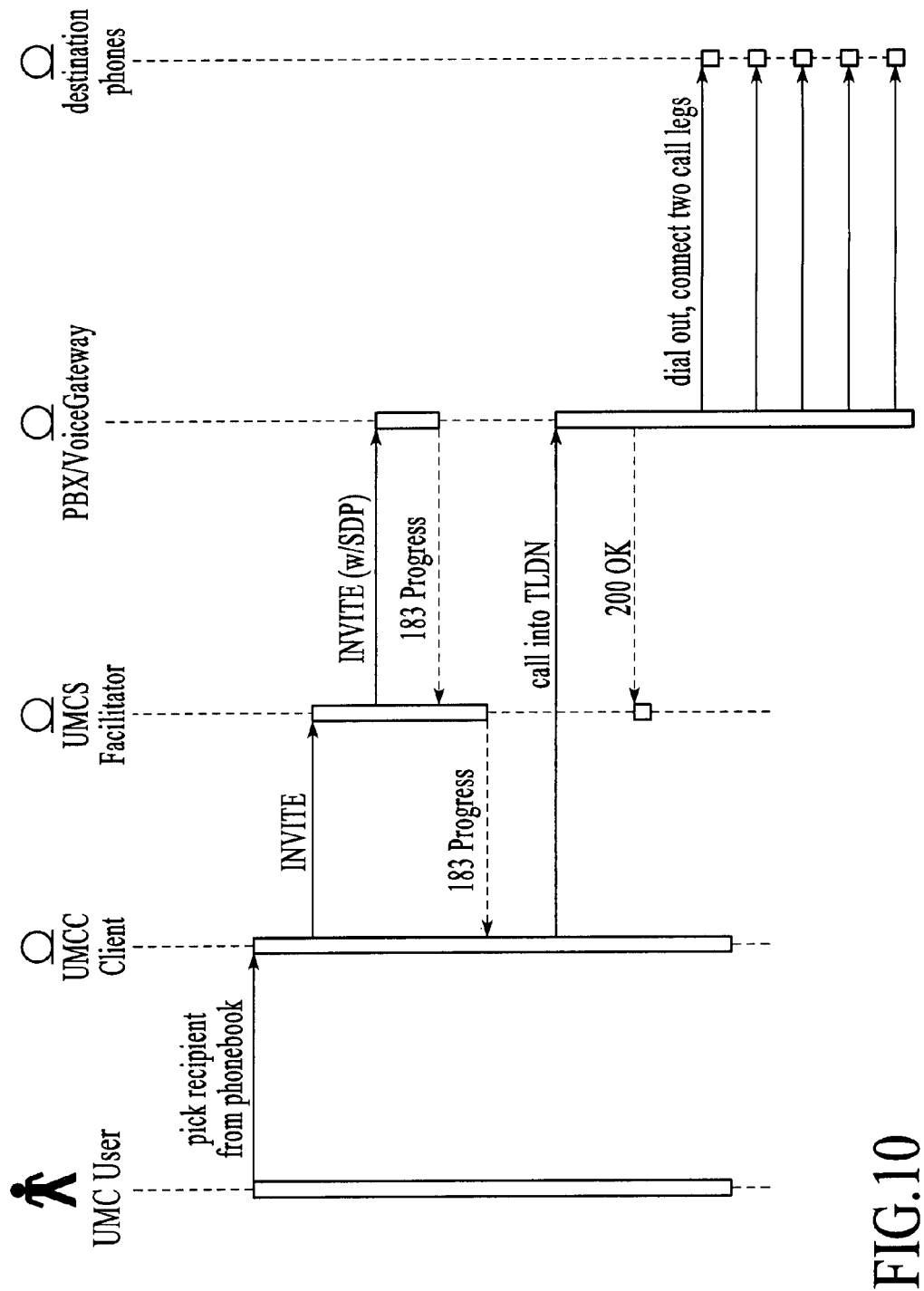
FIG. 10 is a call flow diagram for forward dial via PBX using ad-hoc conferencing, under an embodiment.

FIG. 10 is a call flow diagram for forward dial via PBX using ad-hoc conferencing 1000, under an embodiment. This call flow 1000 is presented as an example call flow 1000 and does not limit the forward dial via PBX using ad-hoc conferencing described herein to only this call flow 1000. The user of a mobile device selects numerous intended call recipients from a phonebook or directory, and information of the intended call recipients is provided to the client hosted on the mobile device; this example includes five (5) call recipients, but the embodiment is not limited to this number of recipients. The client initiates the forward dial via PBX call flow 1000 by generating and sending a dial-via-PBX request or invitation message (e.g., INVITE) to the corresponding facilitator via a data channel. The request message includes contact information of the intended call recipients but is not so limited.

The facilitator generates and transmits a call initiation instruction (e.g., INVITE (w/SDP) to a PBX hosted by the enterprise. The facilitator also responds to the client request by transmitting a call initiation message to the requesting mobile device. The call initiation message includes a transaction ID and a call-in telephone number (e.g., a TLDN) but is not so limited. The call-in telephone number is a telephone number by which the mobile device can establish a telephone connection with the PBX during the forward dial via PBX. The call-in telephone number is provided to the facilitator by the PBX in an embodiment, but the embodiment is not so limited as one or more other components of the AMC system and/or host enterprise can provide the call-in telephone number.

The client of the mobile device initiating the call is configured to automatically initiate a first call leg via a voice channel with the PBX (e.g., call into TLDN) by controlling the mobile device to dial the call-in telephone number received from the facilitator. Once connected with the PBX the client is configured to control the mobile device to transmit the transaction ID to the PBX using, for example, a DTMF tone or sequence. The PBX is configured, in response to receipt or detection of the transaction ID received from the mobile device, to initiate a second outbound call leg to each of the intended call recipients. Once the PBX establishes the outbound call legs with the destination telephone numbers of available ones of the intended recipients, the PBX joins the first outbound call leg and the outbound call legs to the available call recipients into a conference call (e.g., dial out to recipient, connect call legs together).

The AMC system of an alternative embodiment provides dial via PBX through use of a "reverse" dial via PBX using ad-hoc conferencing that includes an inbound call leg from the PBX to the mobile device of the call originator. The numerous call recipients are connected using an outbound call leg from the PBX to the client device of the call recipients. The reverse dial via PBX may be preferred when the PBX-initiated call to the mobile device is relatively cheaper than a call originated at the mobile device to the PBX (forward dial via PBX).

Figure 11:
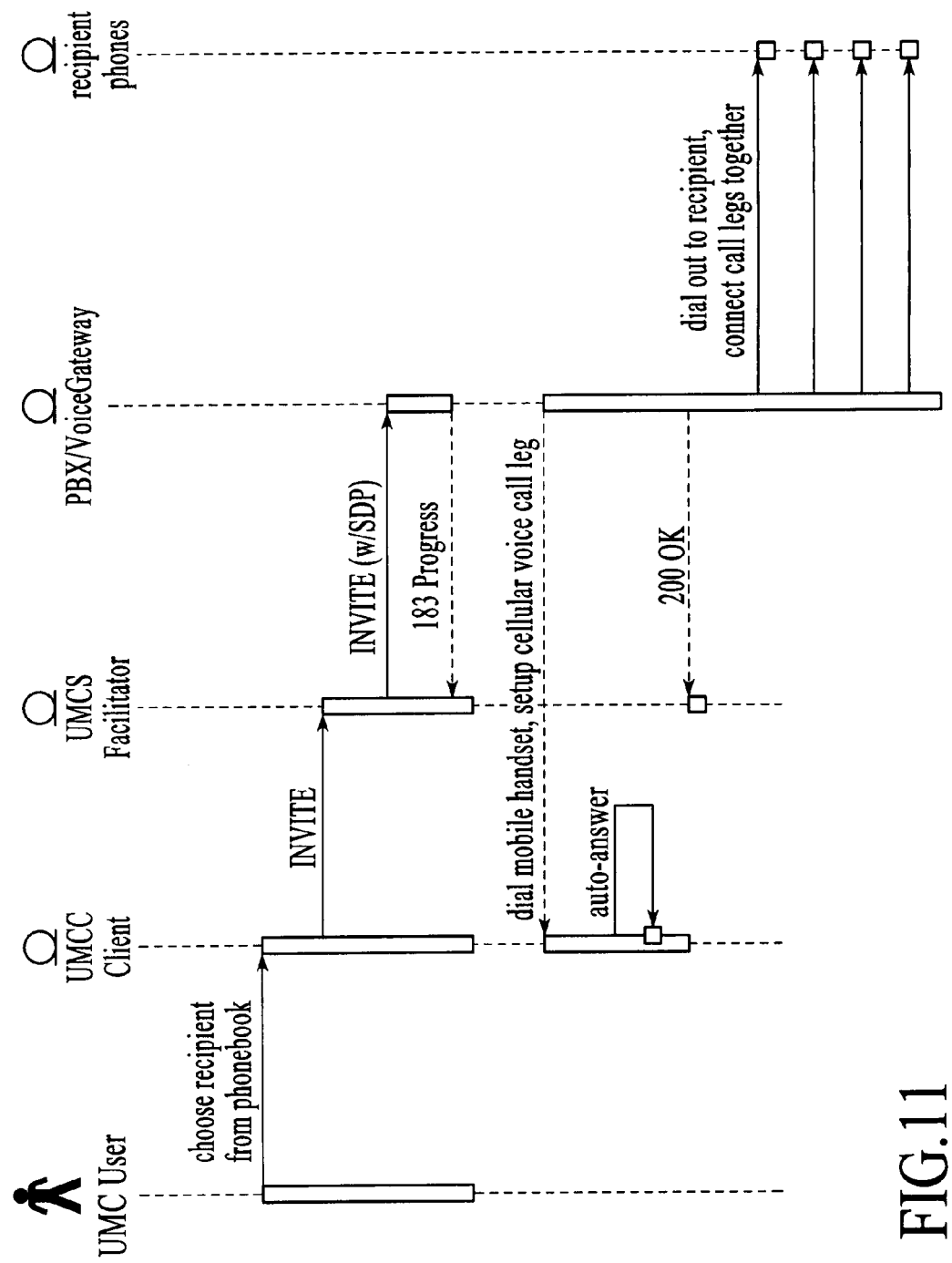
FIG. 11 is a call flow diagram for reverse dial via PBX using ad-hoc conferencing, under an embodiment.

FIG. 11 is a call flow diagram for reverse dial via PBX using ad-hoc conferencing 1100, under an embodiment. This call flow 1100 is presented as an example call flow 1100 and does not limit the reverse dial via PBX using ad-hoc conferencing described herein to only this call flow 1100. The user of a mobile device selects numerous intended call recipients from a phonebook or directory, and information of the intended call recipient is provided to the client hosted on the mobile device; this example includes four (4) call recipients, but the embodiment is not limited to this number of recipients. The client initiates the reverse dial via PBX call flow 1100 by generating and sending a dial-via-PBX request or invitation message (e.g., INVITE) to the corresponding facilitator via a data channel. The request message includes contact information of the intended call recipients but is not so limited.

The facilitator generates and transmits a call initiation instruction (e.g., INVITE (w/SDP) to a PBX hosted by the enterprise. The call initiation instruction, generated in response to the dial-via-PBX request from the client, instructs the PBX to create a first outbound call leg with the requesting mobile device hosting the client via a landline number of the enterprise and a voice channel of the mobile device. The PBX is configured to automatically initiate the first outbound call leg (e.g., dial mobile handset, setup cellular voice cal leg) with the mobile device of the call initiator in response to the call initiation instruction.

The client of an embodiment is configured to automatically answer (e.g., auto-answer) the call from the PBX; alternatively, the user can manually answer the incoming call. The PBX is configured, in response to detecting that the mobile device has answered the call, to initiate outbound call legs to each intended call recipient. Once the PBX establishes the outbound call legs with the destination telephone numbers of the recipients, the PBX joins the first outbound call leg and the outbound call legs to the available call recipients into a conference call (e.g., dial out to recipient, connect call legs together).

While embodiments of the dial via PBX described above include contacting one or more individuals, the dial via PBX of an alternative embodiment enables a caller to contact a resource using class-based call routing. Instead of selecting a person or persons to receive a call, the AMC user selects a class or class group at the mobile device from which he/she is initiating the call. Resources of the class group all possess a common attribute. The attributes by which classes are organized includes one or more of a skill, job specialty code, job title, company, department, and division to name a few. The client of the mobile device and the facilitator operating under the dial via PBX described herein establish a call leg with the facilitator. The facilitator establishes contact with one or more people represented by this resource by establishing call legs with client devices of one or more class resources. Communications are established between the caller and at least one resource when the facilitator forms a conference call including the established call legs.

Figure 12:
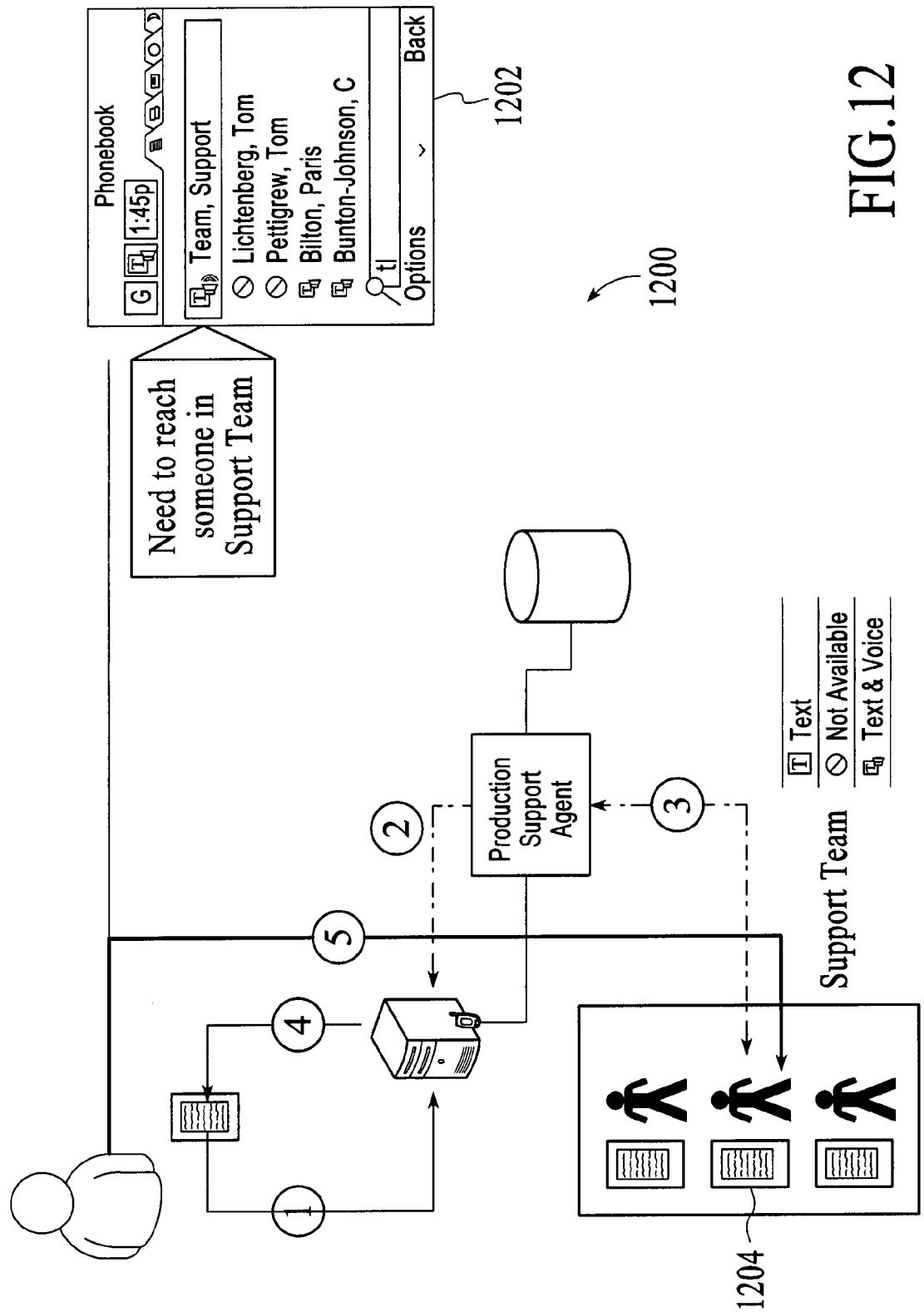
FIG. 12 is a block diagram for dial via PBX using class-based call routing, under an embodiment.

FIG. 12 is an information flow 1200 for dial via PBX using class-based call routing, under an embodiment. In this example, the caller initiates a call to members of a group using skill-based call routing, but the embodiment is not limited to skill-based routing. While membership in the group of this example is according to a skill (e.g., Support Team), group membership could be organized by any attribute (e.g., job title, company department/division, etc.) common to members of a group as determined by the originator when he/she configures or selects the groups using components of the AMC system described herein.

The caller in this example has a need to reach someone in the support team and initiates a call and class-based call request routing by selecting 1 a skill-based group ("Team, Support") at his/her client device. Selection 1 of the skill-based group includes use of phonebook information displayed on the client device user interface 1202 via one or more of the AMC client and facilitator as described above. The phonebook information can include one or more of personal contacts and various ones of enterprise contacts or phonebooks as described herein.

Upon selection of the skill-based group, the facilitator controls or directs the establishment 4 of a call leg between the mobile device of the caller and the enterprise PBX, as described above. Furthermore, the facilitator automatically routes 2 the call to at least one resource or member ("Production Support Agent") of the selected group. The call can be routed to any number of resources of the group, and the resources of the group are defined by one or more attributes of the resource being assigned to or included in the group. The call routing is performed by one or more components or algorithms of the AMC system according to a routing scheme, and the routing scheme is applied under the dial via PBX to control establishment of call legs with one or more call recipients.

A routing scheme of an embodiment determines a routing using information like availability, activity rate, sender preference or search criteria, and resource preference to name a few. As one example, the facilitator attempts to establish a call leg with the first available, least recently used call recipient of the group. The facilitator attempts to establish a call leg with the next available call recipient of the group if the first called recipient does not respond within a predetermined amount of time. This process continues until a call leg is established with a call recipient of the group. If the facilitator is unable to establish a call leg with any recipient, the caller is notified of the situation. While the call routing is sequential in this example, alternative examples or embodiments use parallel routing or more complex routing models (e.g., first try every member of group X, then broadcast call request message to every member of group Y), as described below.

When a resource of the group accepts the call, using his/her client device 1204, a call leg is established 3 with the resource accepting the call. The facilitator then establishes communication 5 between the mobile device of the caller and the client device of the resource by joining the call legs as described above.

The AMC facilitator includes an adapter or adapter framework by which the facilitator simultaneously integrates with components of the enterprise and enterprise servers, as described above with reference to FIG. 3. The facilitator uses an adapter for each enterprise component to which it integrates. The adapter of an embodiment is a protocol-specific adapter for each enterprise component to which it integrates; alternatively, the adapter includes vendor-specific adapters. As an example, the AMC adapters are used in the configuration of groups (classes) and group membership (resources). The AMC adapters can include a set of interfaces and utilities that receive or fetch and convert the data from one or more enterprise components into a common data structure. For example, the AMC adapters can receive information from external systems and use the received information to automatically generate and update configuration of groups and group membership to name a few. This AMC adapter configuration can leverage such external systems as human resource systems, financial systems, customer relationship management (CRM) systems, telephone systems (ACD, etc), directory servers, and email servers to name a few.

The class-based call routing described above includes rule-based routing. The rule-based routing includes the use of rules that can be customized on a group and/or class basis. The rules of an embodiment can be defined via static configuration or dynamic custom processes. A rule can be based on any number of dynamic data inputs, from any number of disparate systems. Further, a rule can trigger additional processes to run before, after, or during the call routing.

The call routing described above can be performed using a variety of routing schemes including, but not limited to, parallel routing, sequential routing, and combined parallel and sequential routing. For example, parallel routing can include simultaneous routing of the call to all resources of the selected group. Parallel routing can also include a first routing of the call to at least one target device of a first set of resources simultaneous with a second routing of the call to at least one target device of a second set of resources.

Sequential routing includes sequential routing to each of the resources of the class group. For example, the sequential routing includes a first routing of the call to a first target device of a first resource, and a second or subsequent routing of the call to a second target device of a second resource in response to a trigger condition (e.g., elapsed time, the absence of the response message to the first routing, etc.). One or more algorithms of the AMC system select an order of call routing to resources of the class group. As another example, the sequential routing includes a first routing of the call to at least one target device of a first set of resources, and a second routing of the call to at least one target device of a second set of resources in response to a trigger condition (e.g., elapsed time, the absence of the response message to the first routing, etc.).

The routing of a subsequent call under sequential routing of an embodiment occurs in response to a trigger condition but is not so limited. The trigger condition can be any condition selected by a user and/or provided by a host enterprise and includes, for example, expiration or termination of a time period since the first routing, receipt of a negative response from the preceding routing, and absence of a response message to the preceding routing to name a few.

The combined parallel and sequential routing includes parallel routing to a first set of resources of the class group, and sequential routing to each of a second set of resources of the class group. Similarly, the combined parallel and sequential routing includes sequential routing to each of a first set of resources of the class group, and parallel routing to a second set of resources of the class group. Additionally, the combined parallel and sequential routing includes parallel routing to a first set of resources of the class group followed sequentially by parallel routing to a second set of resources of the class group.

Resources of a group can be included or excluded from a routing scheme according to routing rules of the AMC system under rule-based routing of an embodiment. The routing rules are determined, for example, by an enterprise hosting the AMC system, and are controlled by one or more of the AMC facilitator and AMC client. The rule-based routing can include routing according to use status of the resource (e.g., routing first to relatively most-used resources, routing first to relatively least-used resources, etc.). The rule-based routing can also include routing according to skill level of the resource (e.g., routing first to relatively higher-skilled resources, routing first to relatively lower-skilled resources, etc.). Furthermore, the rule-based routing includes routing according to availability of the resource, where availability can be inferred by the system or set by the resource (e.g., routing first to available resources, etc.). Additionally, the rule-based routing includes routing according to one or more of class level of the resource and expense level of the resource.

The dial via PBX of an embodiment includes the use of rich caller ID as described herein and in the Related Applications. The facilitator of an embodiment constructs or generates a rich caller ID in response to or upon receipt of a call event, as described above. The rich caller ID includes information, messages, and/or other communications (referred to herein as contact data or caller data) that provide additional context to help in making calls and to help a user in deciding if and/or when to participate in a call. The rich caller ID is generated by mapping a telephone number to a contact within directories of a host enterprise. The telephone number used in the mapping can be, for example, received as caller ID with the incoming call, and input by a user making a call, to name a few. The directories of the host enterprise used by the facilitator in generating the rich caller ID include internal and/or external directories of the enterprise comprising one or more of corporate directories, directory servers, electronic mail servers, CRM systems (e.g., sales lead telephone numbers), telephone systems, human resource systems, financial systems, personal contacts of the user in personal or enterprise directories, and white pages to name a few. As an example, the contact data includes one or more of a name, address, telephone number, electronic mail address, employer, and job of the caller, but the embodiment is not so limited.

In addition to the information automatically received or gathered from the host enterprise, the facilitator can add additional contact data to the rich caller ID. Examples of additional caller data or information added by the facilitator generally include but are not limited to ice breaker information and sales information, for example. Ice breakers include information available in the user's personal contacts that one might find useful in initiating a conversation. As an example, ice breakers can include personal information of the caller (e.g., family, spouse, relative, children, siblings, birthday, anniversary, etc.). Sales information includes status information about one or more previous interactions with the caller or events involving the caller (e.g., a message indicating a status of work promised to the caller, etc.).

The dial via PBX described above enables or includes a number of possible usage scenarios. Descriptions follow of numerous usage scenarios; these usage scenarios are provided as examples only and are not to limit the dial via PBX described herein to only to these usage scenarios.

Under an example usage scenario, a caller through use of the mobile device selects the name of a call recipient from a phone book or contact list and dials the call recipient using the one-click dial (green button) of the mobile device. The phone book or contact list includes local lists or directories of the mobile device as well as one or more directories of the enterprise with which the caller is affiliated. In response, the call is placed directly through a voice channel of the cellular network with which the mobile device is associated.

The caller of another usage scenario selects the name of a call recipient or class group from a phone book or contact list and dials the call recipient(s) using the Options Menu of the AMC user interface. The client controls display of the AMC user interface at the mobile device. The Options menu includes options for "Dial Direct" and "Dial via PBX." Selection of the Dial Direct option results in the call being placed directly through a voice channel of the cellular network with which the mobile device is associated. Selection of the Dial Via PBX option results in the call being placed through the enterprise PBX as described herein.

A caller under yet another example usage scenario uses the mobile device to select the name of a call recipient from a conversation list, and dials the call recipient using the one-click dial (green button) of the mobile device. In response, the call is placed directly through a voice channel of the cellular network with which the mobile device is associated.

Another example usage scenario involves the caller selecting the name of a call recipient from a conversation list and dialing the call recipient through use of the Options Menu of the AMC client interface. The Options menu includes options for "Dial Direct" and "Dial via PBX." Selection of the Dial Direct option results in the call being placed directly through a voice channel of the cellular network with which the mobile device is associated. Selection of the Dial Via PBX option results in the call being placed through the enterprise PBX as described herein.

Using a home screen of the mobile device, under still another usage scenario, a caller enters digits of a telephone number to dial. When the caller dials the call recipient using the one-click dial (green button) of the mobile device, the call is placed directly through a voice channel of the cellular network with which the mobile device is associated. The caller can also choose a dialing preference by pressing a soft key displayed on the phone. The preferences available for selection include "Dial Direct" and "Dial via PBX." Selection of the Dial Direct option results in the call being placed directly through a voice channel of the cellular network with which the mobile device is associated. Selection of the Dial Via PBX option results in the call being placed through the enterprise PBX as described herein.

Alternatively, the caller selects the Dial via PBX option using the Options Menu of the AMC client interface, and enters digits of a telephone number to dial. The caller then dials the call recipient using either the one-click dial (green button) of the mobile device or the Dial menu of the mobile device. The call is placed through the enterprise PBX as described herein.

Using a home screen of the mobile device under other usage scenarios, a caller enters digits of a telephone number to dial; alternatively, the telephone number of the intended call recipient is stored on an enterprise directory. The format of the telephone number is one of the following: Area Code+ Number (408-625-3000); Long Distance access code+Area Code+Number (1408-625-3000); "+" Country code+Area Code+Number (+1408-625-3000); International Prefix+ Country Code+Area Code+Number (011-91-11-524768); Number (768-3000); and PBX Extension (3001). Following entry or selection of a telephone number, the caller selects the Dial via PBX option using the Options Menu of the AMC client interface. The client of the mobile device directly transfers the telephone number digits entered or selected by the user to the facilitator. The facilitator is configured to apply normalization rules and appropriate prefixes to the telephone number and initiates the outbound call via the PBX.

An example caller experience at the mobile device is as follows when the telephone number of the intended recipient is dialed via the enterprise PBX, and the mobile device supports the telephony API to intercept incoming call. The caller is provided a visual and audio indication at the mobile device that the call is being placed. For example, the caller may hear or see displayed a message such as "Please wait while call is dialed" along with an audible indication (beep or tones). The facilitator places an outbound call to the caller, as described herein, and the client of the caller's mobile device intercepts the call and changes the caller message to "Connecting." The facilitator then dials the called party and the caller is provided a ring back tone. When the called party answers, the caller and called party are joined or bridged. When the caller terminates the call before the call is connected to the called party, the facilitator receives a hang up event and terminates the outbound leg of the call to the called party. When the called party number is busy, the facilitator joins the caller and the called party resulting in the caller hearing all tones (e.g., busy) of the outbound call leg to the called party. Similarly, while dialing the called party and the telephone network plays error tones, the facilitator joins the caller and the called party resulting in the caller hearing all tones (e.g., error) of the outbound call leg to the called party. A call log is synchronized from the facilitator to the client. Further, a dialed call log is generated in cases where the called party is busy or other error conditions occur on the network carrying the call.

Another example caller experience at the mobile device is as follows when the telephone number of the intended recipient is dialed via the enterprise PBX, and the mobile device does not support the telephony API to intercept incoming call. The caller is provided a visual indication at the mobile device instructing him/her to pick up an incoming call and wait a short period to hear a call progress tone. For example, the caller may see displayed a message such as "Accept incoming call and wait few seconds for call progress tone." The facilitator places an outbound call to the caller, as described herein, and the outbound call received at the mobile device causes the mobile device to ring. The caller is required to manually accept the call. The facilitator then dials the called party and the caller is provided a ring back tone. When the called party answers, the caller and called party are joined or bridged. When the caller terminates the call before the call is connected to the called party, the facilitator receives a hang up event and terminates the outbound leg of the call to the called party. When the called party number is busy, the facilitator joins the caller and the called party resulting in the caller hearing all tones (e.g., busy) of the outbound call leg to the called party. Similarly, while dialing the called party and the telephone network plays error tones, the facilitator joins the caller and the called party resulting in the caller hearing all tones (e.g., error) of the outbound call leg to the called party. A call log is synchronized from the facilitator to the client. Further, a dialed call log is synchronized from the facilitator to the client. A call log is also generated in cases where the called party is busy or other error conditions occur on the network carrying the call.

An example experience of a called party at his/her client device when a caller dials via PBX includes the called party receiving a caller ID of the calling PBX.

Figure 13:
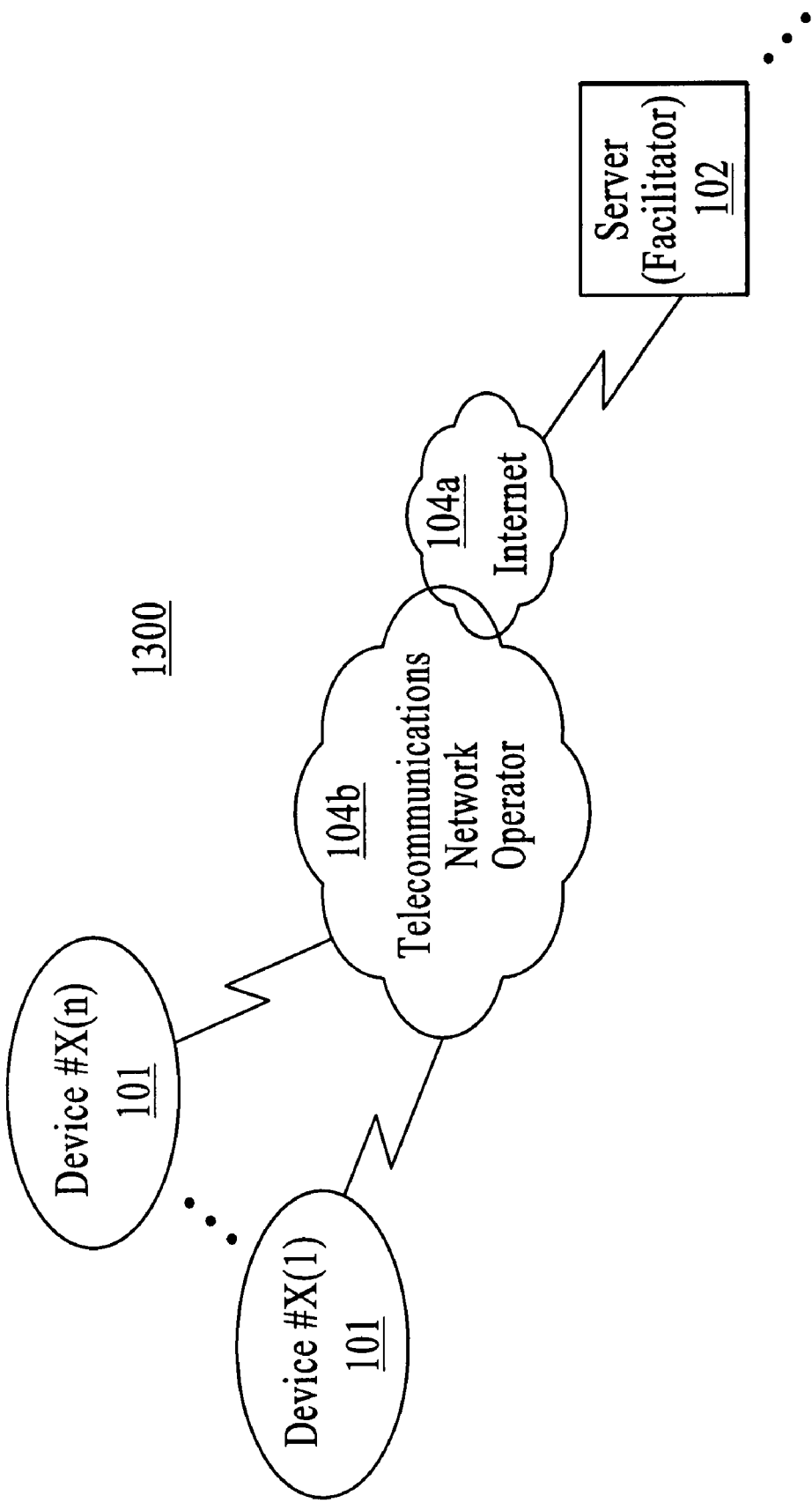
FIG. 13 is a block diagram of an AMC system, under an alternative embodiment.

Some examples follow of alternative AMC system configurations that include the facilitator and client described above. FIG. 13 is a block diagram of an AMC system 1300, under an alternative embodiment. The AMC system 1300 includes a server or other processor-based device hosting the facilitator 102. The facilitator 102 communicates with one or more client devices 101 to provide AMC system functions among the client devices 101 via network couplings that include the Internet 104a and a telecommunications network 104b. The telecommunications network 104b includes, for example, a cellular telephone network or a public switched telephone network (PTSN), but can be other voice and data communication networks as known in the art. The cellular telephone network can use communication protocols that include, for example, Global System for Mobile communication (GSM), General Packet Radio Service (GPRS), Code Division Multiple Access (CDMA), and Time Division Multiple Access (TDMA), but are not so limited.

Figure 14:
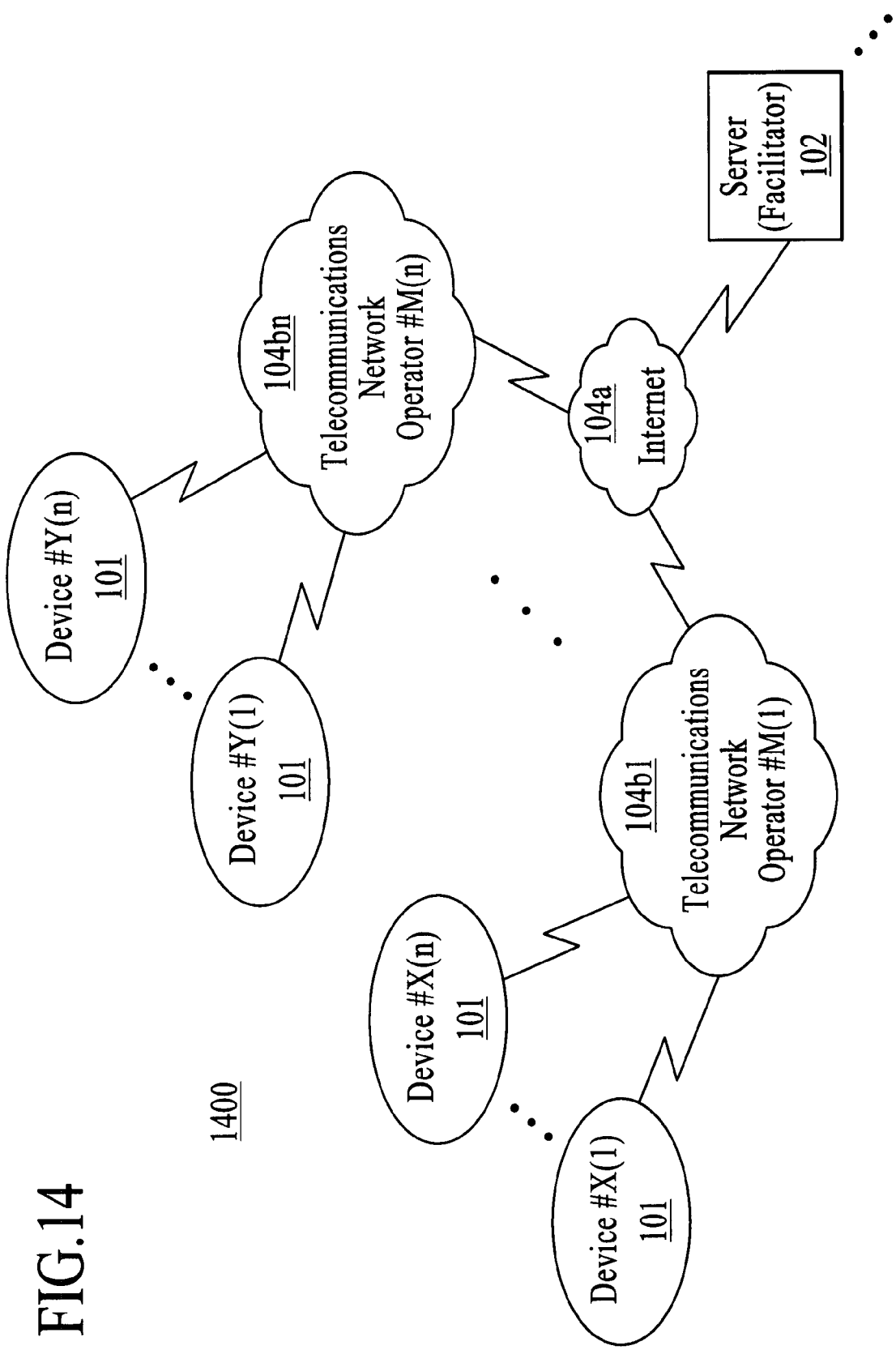
FIG. 14 is a block diagram of an AMC system, under another alternative embodiment.

FIG. 14 is a block diagram of an AMC system 1400, under another alternative embodiment. The AMC system 1400 includes a server hosting the facilitator 102, and the facilitator 102 communicates with one or more client devices 101 to provide AMC system functions among the client devices 101 via network couplings that include the Internet 104a and/or multiple telecommunications networks 104b1 to 104bn. The telecommunications networks 104b1-104bn are as described above, but are not so limited.

Figure 15:
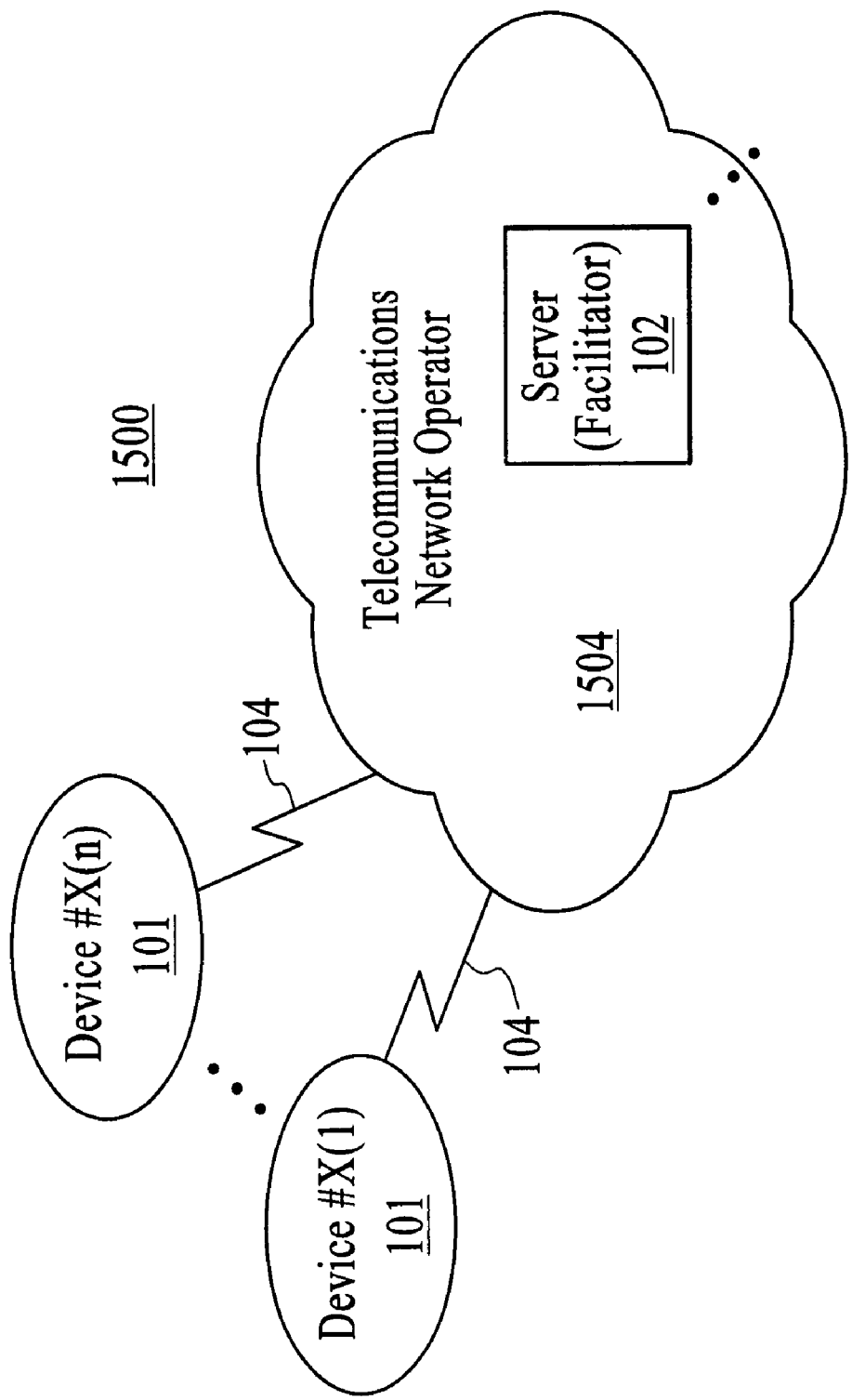
FIG. 15 is a block diagram of an AMC system, under yet another alternative embodiment.

FIG. 15 is a block diagram of an AMC system 1500, under yet another alternative embodiment. The AMC system 1500 includes a server hosting the facilitator 102, and the server/facilitator 102 is a component of a telecommunications network operator infrastructure. The facilitator 102 communicates with one or more client devices 101 to provide AMC system functions among the client devices 101 via network couplings 104, as described above, but is not so limited. In an alternative embodiment, the server/facilitator 102 may not be a component of a telecommunications network operator infrastructure. In another alternative embodiment, the server/facilitator 102 can be a component of one or more other network infrastructures.

Figure 16:
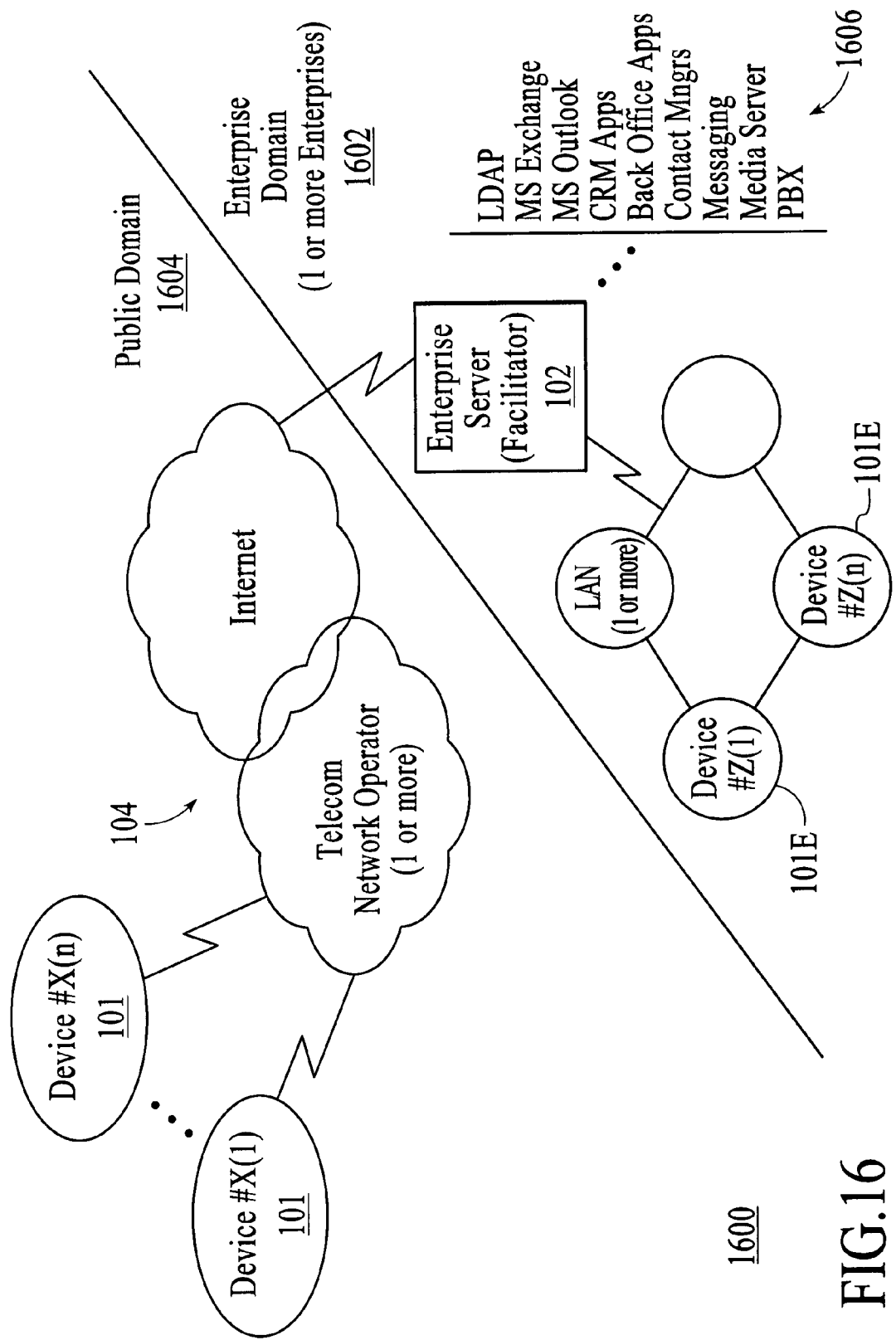
FIG. 16 is a block diagram of an AMC system in an enterprise domain, under another alternative embodiment.

FIG. 16 is a block diagram of an AMC system 1600 in an enterprise domain, under another alternative embodiment. The AMC system 1600 includes a server hosting the facilitator 102 where the server/facilitator 102 is a component of a corporate or enterprise infrastructure 1602. The server can host numerous additional applications 1606 in addition to the facilitator 102 or can be dedicated to the facilitator 102. The facilitator 102 communicates with one or more client devices 101 in the public domain 1604 to provide AMC system functions among the client devices 101 via network couplings 104. The network couplings 104 include, for example, the Internet and one or more telecommunication service provider infrastructures, but can include any number/type of couplings. The facilitator 102 also communicates with one or more client devices 101E in the enterprise domain 1602 to provide AMC system functions among the client devices 101E as described below. The client devices 101E in the enterprise domain 1602 are shown coupled to one or more LANs, but are not so limited.

Figure 17:
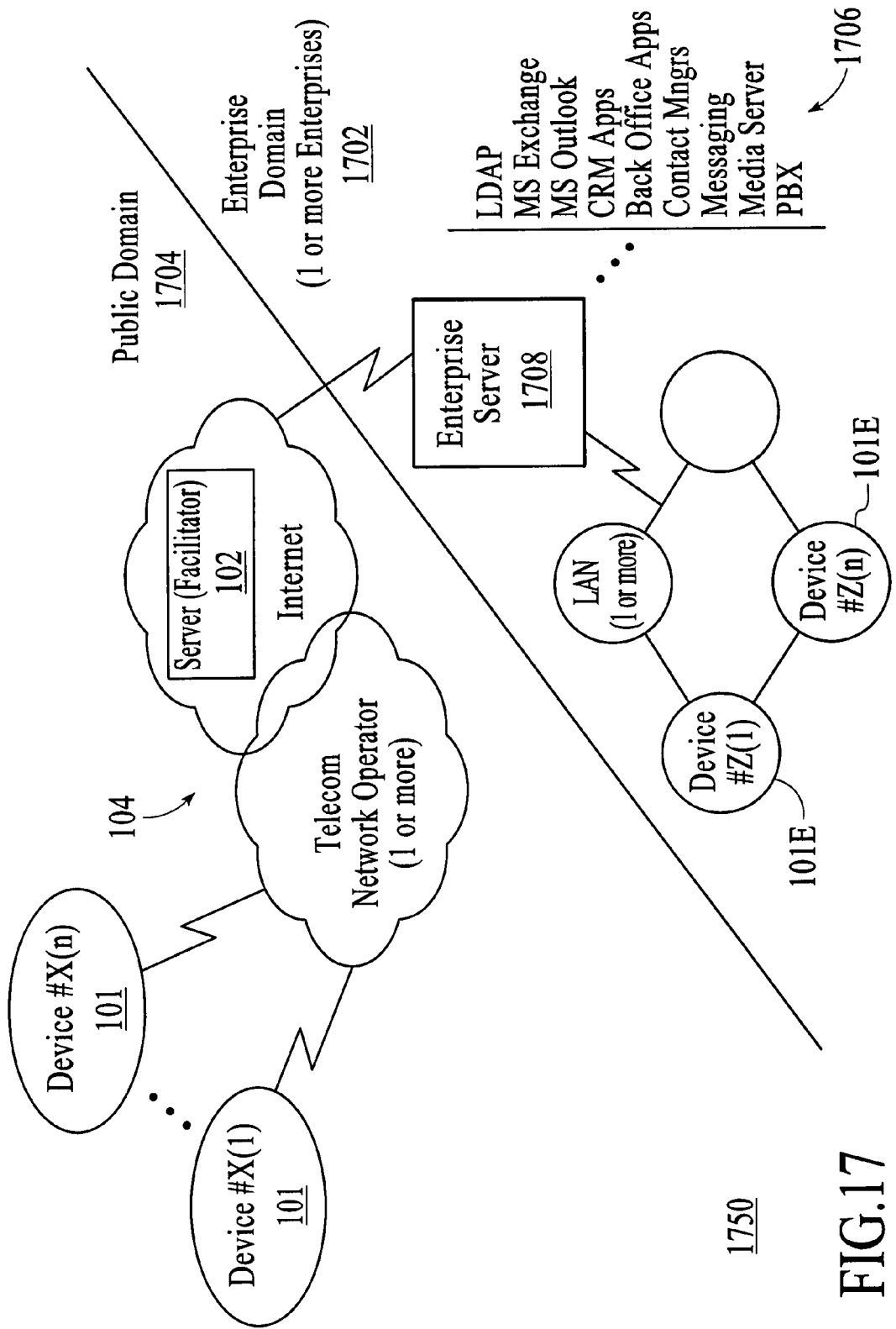
FIG. 17 is a block diagram of an AMC system in a public domain coupled across components of an enterprise domain, under another alternative embodiment.

FIG. 17 is a block diagram of an AMC system 1750 in a public domain coupled across components of an enterprise domain, under another alternative embodiment. The AMC system 1750 includes a server hosting the facilitator 102 where the server/facilitator 102 is a component of a carrier or service provider infrastructure or hosted data center infrastructure for example, but is not so limited. The facilitator 102 communicates with one or more client devices 101 in the public domain 1704 to provide AMC system functions among the client devices 101 via network couplings 104. The network couplings 104 include, for example, the Internet and one or more telecommunication service provider infrastructures, but can include any number/type of couplings. The facilitator 102 also communicates with components of the enterprise domain 1702 including, for example, one or more client devices 110E, one or more enterprise servers 1708, and one or more LANs. The facilitator 102 provides AMC system functions among the client devices 101E as described below. The client devices 101E in the enterprise domain 1702 are shown coupled to one or more LANs, but are not so limited.

As an alternative to the couplings of this AMC system 1750, the facilitator can be hosted on one or more servers (not shown) of the telecommunications network operator. The facilitator of the telecommunications network operator couples to the enterprise servers via local contact servers (not shown) and/or Virtual Private Network (VPN) couplings, but is not so limited.

Figure 18:
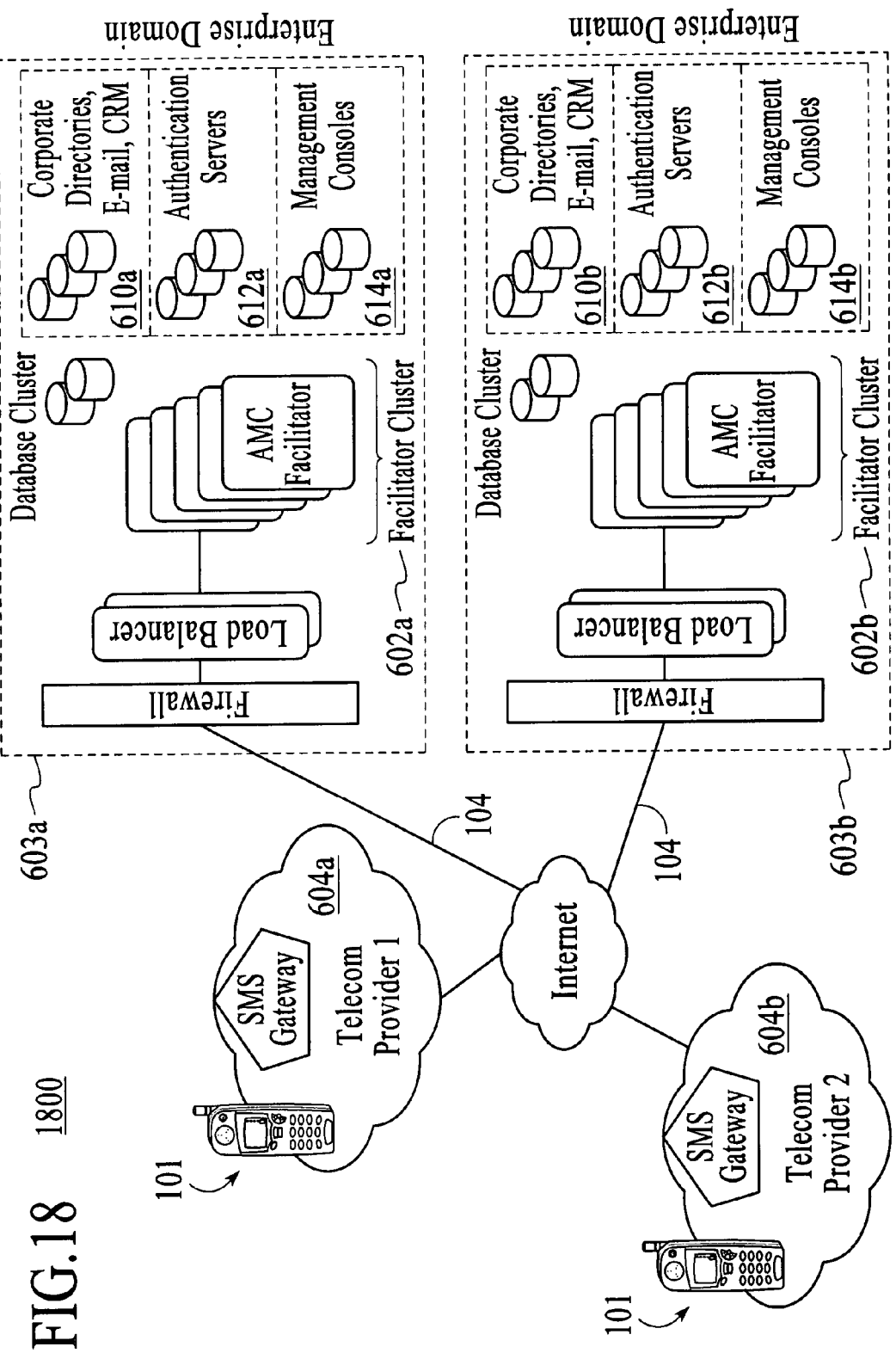
FIG. 18 is a block diagram of an AMC system in an enterprise domain, under still another alternative embodiment.

FIG. 18 is a block diagram of an AMC system 1800 in an enterprise domain, under still another alternative embodiment. The AMC system 1800 includes one or more facilitators that form facilitator clusters 602a and 602b within each of a number of enterprise domains 603a and 603b. Facilitators of the facilitator clusters 602a and 602b communicate with one or more client devices 101 to provide AMC system functions among the client devices 101 via network couplings 104. The network couplings 104 include, for example, at least one of the Internet and multiple telecommunication service providers 604a and 604b, but can include any number/type of couplings. The facilitators also couple with at least one of corporate directory servers and/or electronic mail (email) servers 610a/610b, authentication servers 612a/612b, and management consoles 614a/614b of the enterprise domains 603a/603b, but are not so limited.

Figure 19:
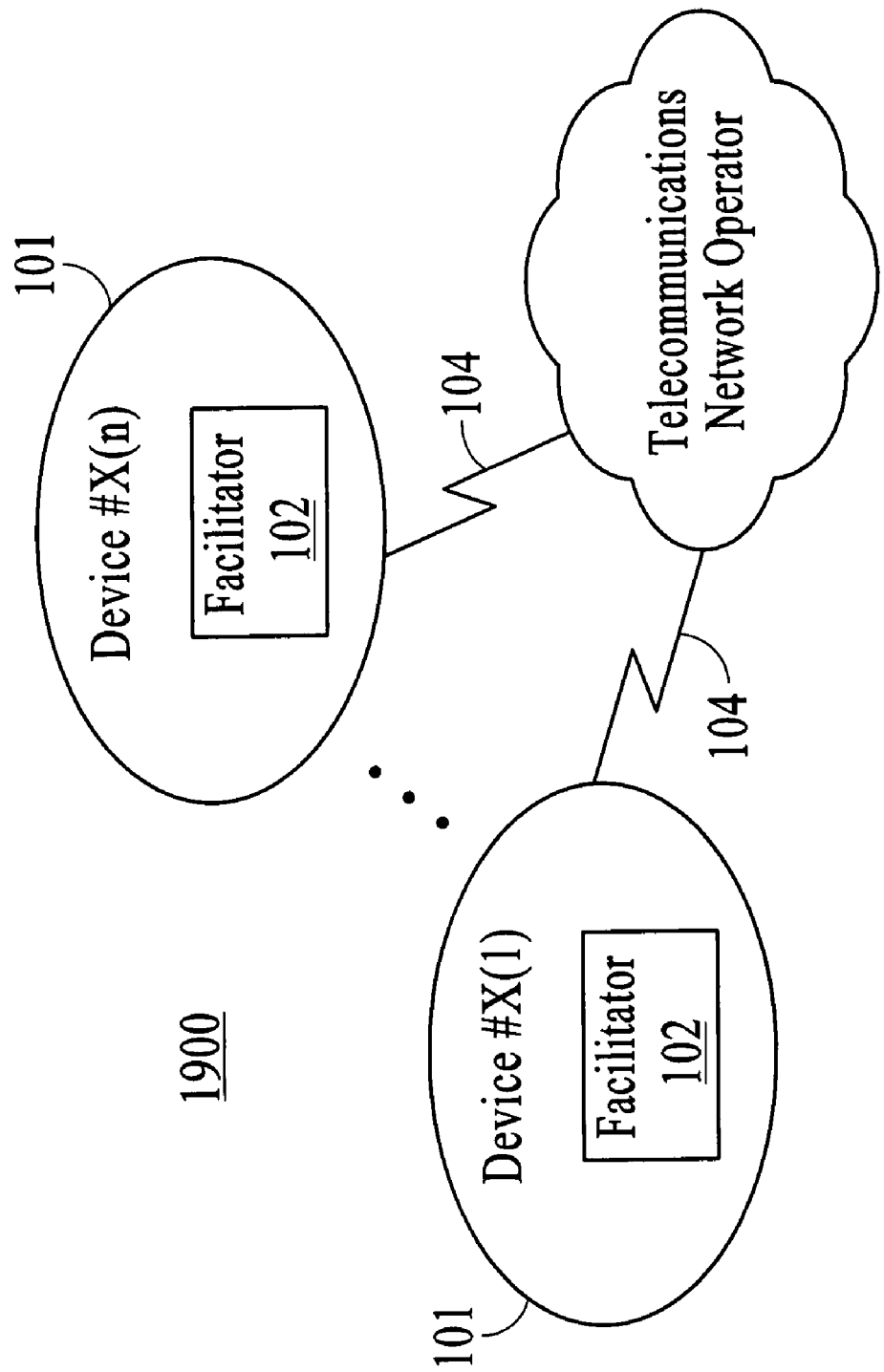
FIG. 19 is a block diagram of an active mobile collaboration (AMC) system, under an embodiment.

FIG. 19 is a block diagram of an active mobile collaboration (AMC) system 1900, under an embodiment. The AMC system 1900 includes any number X(n) of communication devices 101 coupled for communication via one or more facilitators 102 and one or more couplings 104. One or more of the communication devices 101 include an AMC client application. Additionally, one or more of the communication devices 101 include the facilitator 102. The AMC client applications and facilitator applications function to allow users of the communication devices to dynamically manage how and when mobile calls take place, intelligently screen calls based on caller identity, urgency, and subject matter, determine which contacts in a directory are available to talk and which ones choose not to be disturbed, and increase accessibility of enterprise and personal contact information from mobile phones, as described in detail below.

The AMC system components including the facilitator and AMC client described above function to allow users of the client devices or handsets like cellular telephones to quickly coordinate conversations, screen unwanted calls and interruptions and access enterprise directories. Specifically, the AMC system components increase call success rates by dynamically managing how and when mobile calls take place, let users intelligently screen calls based on caller identity, urgency and subject matter, quickly show which contacts are available to talk and which contacts choose not to be disturbed, reduce interruptions while encouraging urgently needed call-backs, and increase accessibility of enterprise and personal contact information from mobile phones.

The communication systems of an embodiment enable dial via PBX as described above. In so doing, the communication systems of an embodiment include a method comprising receiving a request at a server via a data channel coupled to a mobile device. The server of an embodiment is coupled to an enterprise. The method of an embodiment includes initiating in response to the request a first call leg over a first voice channel. The first call leg of an embodiment is between the server and the mobile device. The method of an embodiment includes initiating a second call leg over a second voice channel. The second call leg of an embodiment is between the server and a client device. The method of an embodiment includes forming a voice conference call between the mobile device and the client device by joining the first call leg and the second call leg.

The client device of an embodiment includes a device accessible via a telephone number.

The mobile device of an embodiment includes one or more of a mobile device, a wireless device, a wireline device, a voice over Internet Protocol (VOIP) device, a private branch exchange device, a soft client, and a desktop client.

The receiving of the request of an embodiment is via a data channel coupled to the mobile device and the server.

The request of an embodiment includes contact data of at least one call recipient corresponding to the client device. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes receiving at the mobile device a selection of the at least one call recipient.

The server of an embodiment includes one or more of a server and a private branch exchange (PBX).

The initiating of the first call leg of an embodiment comprises transmitting a call initiation message from the server to the mobile device in response to the request. The initiating of the first call leg of an embodiment comprises initiating the first call leg between the mobile device and the telephone server. The initiating of an embodiment uses information of the call initiation message.

The transmitting of the call initiation message of an embodiment is via the data channel.

The call initiation message of an embodiment includes a telephone number. The initiating of the first call leg of an embodiment comprises the mobile device automatically calling the telephone server using the telephone number.

The method of an embodiment includes receiving a first signal from the mobile device via the first call leg. The first signal of an embodiment is sent in response to the initiating of the first call leg.

The initiating of the second call leg of an embodiment is in response to the receiving of the first signal.

The request of an embodiment includes contact data of at least one call recipient. The initiating of the second call leg comprises the telephone server automatically calling the client device using the contact data.

The method of an embodiment includes receiving a second signal from the client device via the second call leg. The second signal is received at the server in response to the initiating of the second call leg.

The method of an embodiment includes automatically transmitting a prompt to the client device via the second call leg. The second signal is received in response to the prompt.

The joining of the first call leg and the second call leg of an embodiment is in response to the receiving of the second signal.

The method of an embodiment includes disconnecting the first call leg when the initiating of the second call leg fails.

The method of an embodiment includes sending contact data of at least one call recipient to the first client device in response to the request. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes transferring a call initiation message from the server to the telephone server in response to the request. The method of an embodiment includes initiating the first call leg between the telephone server and the mobile device in response to the call initiation message.

The call initiation message of an embodiment instructs the telephone server to generate the first call leg using a first voice channel of the enterprise.

The call initiation message of an embodiment includes a telephone number. The initiating of the first call leg comprises the telephone server automatically calling the mobile device.

The method of an embodiment includes transferring a third signal from the server to the mobile device via the first call leg. The third signal of an embodiment confirms to the mobile device that the first call leg is being initiated by the server.

The transferring of the third signal of an embodiment is via one or more of the first voice channel and the data channel.

The transferring of the third signal via the first voice channel of an embodiment is one or more of in-band and out-of-band.

The method of an embodiment includes transferring a fourth signal from the mobile device to the server via the first call leg in response to receiving the third signal.

The initiating of the second call leg of an embodiment is in response to the receiving of the fourth signal.

The method of an embodiment includes the server instructing the telephone server to generate the second call leg.

The method of an embodiment includes disconnecting the first call leg when the initiating of the second call leg fails.

The request of an embodiment includes contact data of at least one call recipient. The initiating of the second call leg of an embodiment comprises the telephone server automatically calling the client device using the contact data.

The method of an embodiment includes receiving a fifth signal from the client device via the second call leg in response to the initiating of the second call leg.

The joining of the first call leg and the second call leg of an embodiment is in response to the receiving of the fifth signal.

The method of an embodiment includes re-initiating the first call leg in response to termination of the first call leg by one or more of the mobile device and the server.

The method of an embodiment includes disconnecting the first call leg in response to detecting termination of the second call leg. The method of an embodiment includes disconnecting the second call leg in response to detecting termination of the first call leg.

The request of an embodiment includes contact data of a plurality of call recipients. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes initiating at least one other call leg with at least one other client device of at least one of the plurality of call recipients.

The initiating of the at least one other call leg of an embodiment comprises the telephone server automatically calling the at least one other client device using the contact data.

The at least one other call leg of an embodiment includes at least one other voice channel.

The method of an embodiment includes receiving at least one other signal from the at least one other client device via the at least one other call leg.

The method of an embodiment includes automatically transmitting a prompt to the at least one other client device via the at least one other call leg. The at least one other signal of an embodiment is received in response to the prompt.

The method of an embodiment includes joining the at least one other call leg to the first call leg and the second call leg.

The joining of the at least one other call leg of an embodiment is in response to the receiving of the at least one other signal.

The request of an embodiment includes information of a class.

The initiating of the second call leg of an embodiment comprises initiating the second call leg between the telephone server and resources of a class group. The resources of an embodiment possess an attribute of the class. The class group includes one or more resources having one or more attributes in common.

The method of an embodiment includes determining the resources from a plurality of contacts of the enterprise.

The initiating of an embodiment comprises attempting to initiate the second call leg with a plurality of client devices. The plurality of client devices of an embodiment corresponds to the resources. The plurality of client devices of an embodiment includes the client device.

The attempting to initiate of an embodiment includes attempting in parallel to initiate the second call leg with each of the plurality of client devices.

The attempting to initiate of an embodiment includes attempting in sequence to initiate the second call leg with each of the plurality of client devices.

The method of an embodiment includes determining a hierarchy of the attempting. The hierarchy of an embodiment defines an order for attempting to initiate the second call leg with the plurality of client devices.

The attempting to initiate of an embodiment includes attempting in parallel to initiate the second call leg with each of a first set of the plurality of client devices. The attempting to initiate of an embodiment includes attempting in sequence to initiate the second call leg with each of a second set of the plurality of client devices.

The attempting to initiate of an embodiment includes attempting to initiate according to availability of the resources. The availability of an embodiment includes one or more of presence of the resources, reachable status of the resources, availability determined by a host system, and availability specified by the resources.

The attempting to initiate of an embodiment includes attempting to initiate in accordance with context information. The context information of an embodiment includes at least one of a connectivity state and an availability profile of each of the plurality of client devices.

The data channel of an embodiment includes a cellular data channel of a cellular network.

The first voice channel of an embodiment includes a cellular voice channel of a cellular network.

The communication systems of an embodiment include a system comprising a server coupled to an enterprise and at least one communication network. The server of an embodiment is configured to receive a request from a mobile device via a data channel. The server of an embodiment is configured to initiate in response to the request a first call leg with the mobile device over a first voice channel. The server of an embodiment is configured to initiate a second call leg with a client device over a second voice channel. The server of an embodiment is configured to form a voice conference call between the mobile device and the client device by joining the first call leg and the second call leg.

The client device of an embodiment includes a device accessible via a telephone number. The mobile device of an embodiment includes one or more of a mobile device, a wireless device, a wireline device, a voice over Internet Protocol (VOIP) device, a private branch exchange device, a soft client, and a desktop client.

The request of an embodiment includes contact data of at least one call recipient corresponding to the client device. The contact data of an embodiment includes a telephone number.

The server of an embodiment includes one or more of a server and a private branch exchange (PBX).

The server of an embodiment is configured to initiate the first call leg by transmitting a call initiation message via the data channel to the mobile device in response to the request. The initiating of an embodiment uses information of the call initiation message.

The call initiation message of an embodiment includes a telephone number. The mobile device of an embodiment is configured to automatically call the telephone server using the telephone number.

The server of an embodiment is configured to receive a first signal from the mobile device via the first call leg. The first signal of an embodiment is sent in response to the initiating of the first call leg.

The telephone server of an embodiment is configured to initiate the second call leg in response to receiving the first signal.

The request of an embodiment includes contact data of at least one call recipient. The telephone server of an embodiment initiates the second call leg by automatically calling the client device using the contact data.

The server of an embodiment is configured to receive a second signal from the client device via the second call leg. The second signal of an embodiment is received in response to the initiating of the second call leg.

The server of an embodiment is configured to join the first call leg and the second call leg in response to the receiving of the second signal.

The server of an embodiment is configured to initiate the first call leg by transmitting a call initiation message via the data channel to the telephone server in response to the request. The initiating of an embodiment uses information of the call initiation message.

The call initiation message of an embodiment instructs the telephone server to generate the first call leg using a first voice channel of the enterprise.

The call initiation message of an embodiment includes a telephone number. The initiating of the first call leg of an embodiment comprises the telephone server automatically calling the mobile device.

The server of an embodiment is configured to transfer a third signal to the mobile device via the first call leg. The third signal of an embodiment confirms to the mobile device that the first call leg is being initiated by the server. The transferring of the third signal of an embodiment is via one or more of the first voice channel and the data channel. The transferring of the third signal via the first voice channel of an embodiment is one or more of in-band and out-of-band.

The server of an embodiment is configured to receive a fourth signal from the mobile device via the first call leg in response to transferring of the third signal.

The server of an embodiment is configured to instruct the telephone server to generate the second call leg.

The request of an embodiment includes contact data of at least one call recipient. The telephone server of an embodiment is configured to initiate the second call leg by automatically calling the client device using the contact data.

The server of an embodiment is configured to receive a fifth signal from the client device via the second call leg in response to the initiating of the second call leg.

The server of an embodiment is configured to join the first call leg and the second call leg in response to the receiving of the fifth signal.

The server of an embodiment is configured to re-initiate the first call leg in response to termination of the first call leg.

The server of an embodiment is configured to disconnect the first call leg in response to detecting termination of the second call leg and disconnect the second call leg in response to detecting termination of the first call leg.

The communication systems of an embodiment include a computer readable media including executable instructions which, when executed in a processing system, provide calling via a remote telephone system by receiving a request at a server via a data channel coupled to a mobile device. The server of an embodiment is coupled to an enterprise. The executable instructions of an embodiment, when executed, provide calling via a remote telephone system by initiating in response to the request a first call leg over a first voice channel. The first call leg of an embodiment is between the server and the mobile device. The executable instructions of an embodiment, when executed, provide calling via a remote telephone system by initiating a second call leg over a second voice channel. The second call leg of an embodiment is between the server and a client device. The executable instructions of an embodiment, when executed, provide calling via a remote telephone system by forming a voice conference call between the mobile device and the client device by joining the first call leg and the second call leg.

The communication systems of an embodiment enable forward dial via PBX as described above. In so doing, the communication systems of an embodiment include a method comprising receiving a dial request from a first client device at a server. The method of an embodiment includes transmitting a call initiation message from the server to the first client device in response to the dial request. The method of an embodiment includes initiating a first call leg between the first client device and a telephone server. The initiating of an embodiment uses information of the call initiation message. The method of an embodiment includes initiating a second call leg between the telephone server and a second client device. The method of an embodiment includes joining the first call leg and the second call leg to form a voice conference call.

The voice conference call between the first client device and the second client device of an embodiment is via the telephone server. The first client device of an embodiment is a mobile device and the telephone server is hosted by an enterprise.

Each of the first client device and the second client device of an embodiment includes one or more of a mobile device, a wireless device, a wireline device, a voice over Internet Protocol (VOIP) device, a private branch exchange device, a soft client, and a desktop client.

The receiving of the dial request of an embodiment is via a data channel coupled to the first client device and the server. The data channel of an embodiment is provided by one or more of an enterprise, a service provider, and a mobile network operator.

The dial request of an embodiment includes contact data of at least one call recipient corresponding to the second client device. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes receiving at the first client device a selection of the at least one call recipient.

The transmitting of the call initiation message of an embodiment is via a data channel coupled to the first client device and the server.

The call initiation message of an embodiment includes a telephone number.

The initiating of the first call leg of an embodiment comprises the first client device automatically calling the telephone server using the telephone number.

The first call leg of an embodiment includes a first voice channel.

The method of an embodiment includes receiving a first signal from the first client device via the first call leg.

The first signal of an embodiment is received at the telephone server in response to the initiating of the first call leg.

The first signal of an embodiment includes a transaction identification.

The call initiation message of an embodiment includes the transaction identification.

The first signal of an embodiment includes a dual-tone multi-frequency (DTMF) signal.

The initiating of the second call leg of an embodiment is in response to the receiving of the first signal.

The dial request of an embodiment includes contact data of at least one call recipient.

The contact data of an embodiment includes a device telephone number of the second client device.

The initiating of the second call leg of an embodiment comprises the telephone server automatically calling the second client device using the contact data.

The second call leg of an embodiment includes a second voice channel.

The method of an embodiment includes receiving a second signal from the second client device via the second call leg.

The second signal of an embodiment is received at the telephone server in response to the initiating of the second call leg.

The method of an embodiment includes automatically transmitting a prompt to the second client device via the second call leg. The second signal of an embodiment is received in response to the prompt.

The second signal of an embodiment includes a DTMF signal.

The joining of the first call leg and the second call leg of an embodiment is in response to the receiving of the second signal.

The method of an embodiment includes disconnecting the first call leg when the initiating of the second call leg fails.

The server of an embodiment includes at least one enterprise server of an enterprise.

The telephone server of an embodiment includes a private branch exchange (PBX) coupled to the enterprise.

The method of an embodiment includes disconnecting the first call leg in response to detecting termination of the second call leg. The method of an embodiment includes disconnecting the second call leg in response to detecting termination of the first call leg.

The dial request of an embodiment includes contact data of a plurality of call recipients. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes initiating at least one other call leg with at least one other client device of at least one of the plurality of call recipients.

The initiating of the at least one other call leg of an embodiment comprises the telephone server automatically calling the at least one other client device using the contact data.

The at least one other call leg of an embodiment includes at least one other voice channel.

The method of an embodiment includes receiving at least one other signal from the at least one other client device via the at least one other call leg.

The at least one other signal of an embodiment is received at the telephone server in response to the initiating of the at least one other call leg.

The method of an embodiment includes automatically transmitting a prompt to the at least one other client device via the at least one other call leg. The at least one other signal of an embodiment is received in response to the prompt.

The method of an embodiment includes joining the at least one other call leg to the first call leg and the second call leg.

The joining of the at least one other call leg of an embodiment is in response to the receiving of the at least one other signal.

The dial request of an embodiment includes information of a class.

The initiating of the second call leg between the telephone server and the second client device of an embodiment comprises initiating the second call leg between the telephone server and resources of a class group. The resources of an embodiment possess an attribute of the class.

The class group of an embodiment includes one or more resources having one or more attributes in common.

The method of an embodiment includes determining the resources from a plurality of contacts of an enterprise. The enterprise of an embodiment includes the resources.

The initiating of an embodiment comprises attempting to initiate the second call leg with a plurality of client devices. The plurality of client devices of an embodiment corresponds to the resources. The plurality of client devices of an embodiment includes the second client device.

The attempting to initiate of an embodiment includes attempting in parallel to initiate the second call leg with each of the plurality of client devices.

The method of an embodiment includes calling at least one target device of a first set of the plurality of client devices. The method of an embodiment includes calling at least one target device of a second set of the plurality of client devices.

The attempting to initiate of an embodiment includes attempting in sequence to initiate the second call leg with each of the plurality of client devices.

The method of an embodiment includes determining a hierarchy of the attempting, wherein the hierarchy defines an order of the sequence.

The attempting to initiate of an embodiment includes attempting in parallel to initiate the second call leg with each of a first set of the plurality of client devices. The attempting to initiate of an embodiment includes attempting in sequence to initiate the second call leg with each of a second set of the plurality of client devices.

The attempting to initiate of an embodiment includes attempting to initiate according to availability of the resources. The availability of an embodiment includes one or more of presence of the resources, reachable status of the resources, availability determined by a host system, and availability specified by the resources.

The attempting to initiate of an embodiment includes attempting to initiate in accordance with context information. The context information of an embodiment includes at least one of a connectivity state and an availability profile of each of the plurality of client devices.

The server of an embodiment is hosted by one or more of an enterprise, a service provider, and a mobile network operator.

One or more of the first call leg and the second call leg of an embodiment is provided by one or more of an enterprise, a service provider, and a mobile network operator.

The method of an embodiment includes transferring signals between the first client device and the server via a data channel. The data channel of an embodiment includes a cellular data channel of a cellular network.

The method of an embodiment includes transferring media between the first client device and the server via the first call leg. The first call leg of an embodiment includes a cellular voice channel of a cellular network.

The communication systems of an embodiment include a system comprising a server coupled to an enterprise and at least one communication network. The server of an embodiment is configured to receive a dial request from a first client device and in response transmit a call initiation message to the first client device. The server of an embodiment is configured to initiate a first call leg between the first client device and a telephone server using information of the call initiation message. The server of an embodiment is configured to initiate a second call leg between the telephone server and a second client device. The server of an embodiment is configured to join the first call leg and the second call leg to form a voice conference call.

The voice conference call between the first client device and the second client device of an embodiment is via the telephone server. The first client device of an embodiment is a mobile device and the telephone server is hosted by an enterprise.

Each of the first client device and the second client device of an embodiment includes one or more of a mobile device, a wireless device, a wireline device, a voice over Internet Protocol (VOIP) device, a private branch exchange device, a soft client, and a desktop client.

The server of an embodiment is configured to receive the dial request via a data channel coupled to the first client device. The data channel of an embodiment is provided by one or more of an enterprise, a service provider, and a mobile network operator.

The dial request of an embodiment includes contact data of at least one call recipient corresponding to the second client device. The contact data of an embodiment includes a telephone number.

The server of an embodiment is configured to transmit the call initiation message via a data channel coupled to the first client device.

The call initiation message of an embodiment includes a telephone number. The initiating of the first call leg of an embodiment comprises the first client device automatically calling the telephone server using the telephone number.

The first call leg of an embodiment includes a first voice channel and the second call leg includes a second voice channel.

The telephone server of an embodiment is configured to receive a first signal from the first client device via the first call leg in response to the initiating of the first call leg.

The first signal of an embodiment includes a transaction identification. The call initiation message of an embodiment includes the transaction identification.

The first signal of an embodiment includes a dual-tone multi-frequency (DTMF) signal.

The initiating of the second call leg of an embodiment is in response to the receiving of the first signal.

The dial request of an embodiment includes contact data of at least one call recipient. The contact data of an embodiment includes a device telephone number of the second client device.

The telephone server of an embodiment is configured to initiate the second call leg by automatically calling the second client device using the contact data.

The telephone server of an embodiment is configured to receive a second signal from the second client device via the second call leg in response to the initiating of the second call leg.

The second signal of an embodiment includes a DTMF signal.

The joining of the first call leg and the second call leg of an embodiment is in response to the receiving of the second signal.

The server of an embodiment includes at least one enterprise server of an enterprise.

The telephone server of an embodiment includes a private branch exchange (PBX).

The server of an embodiment is configured to disconnect the first call leg in response to detecting termination of the second call leg, and disconnect the second call leg in response to detecting termination of the first call leg.

The communication systems of an embodiment include a computer readable media including executable instructions which, when executed in a processing system, provide calling via a remote telephone system by receiving a dial request from a first client device at a server. The instructions of an embodiment, when executed, provide calling via a remote telephone system by transmitting a call initiation message from the server to the client device in response to the dial request. The instructions of an embodiment, when executed, provide calling via a remote telephone system by initiating a first call leg between the client device and a telephone server. The initiating of an embodiment uses information of the call initiation message. The instructions of an embodiment, when executed, provide calling via a remote telephone system by initiating a second call leg between the telephone server and a second client device. The instructions of an embodiment, when executed, provide calling via a remote telephone system by joining the first call leg and the second call leg to form a voice conference call.

The communication systems of an embodiment enable reverse dial via PBX as described above. In so doing, the communication systems of an embodiment include a method comprising receiving a dial request from a first client device at a server. The method of an embodiment includes transferring a call initiation message from the server to a telephone server in response to the dial request. The method of an embodiment includes initiating a first call leg between the telephone server and the first client device in response to the call initiation message. The method of an embodiment includes initiating a second call leg between the telephone server a second client device. The method of an embodiment includes joining the first call leg and the second call leg to form a voice conference call.

The voice conference call between the first client device and the second client device of an embodiment is via the telephone server. The first client device of an embodiment is a mobile device and the telephone server is hosted by an enterprise.

Each of the first client device and the second client device of an embodiment includes one or more of a mobile device, a wireless device, a wireline device, a voice over Internet Protocol (VOIP) device, a private branch exchange device, a soft client, and a desktop client.

The receiving of the dial request of an embodiment is via a data channel coupled to the first client device and the server.

The dial request of an embodiment includes contact data of at least one call recipient corresponding to the second client device. The contact data of an embodiment includes one or more of a telephone number and uniform resource locator (URL).

The method of an embodiment includes receiving at the first client device a selection of the at least one call recipient.

The method of an embodiment includes sending contact data of at least one call recipient to the first client device in response to the dial request. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes transferring a message via a data channel to the first client device in response to successful receipt of the dial request at the server.

The call initiation message of an embodiment instructs the telephone server to generate the first call leg using a first voice channel of an enterprise coupled to the telephone server.

The call initiation message of an embodiment includes a telephone number.

The initiating of the first call leg of an embodiment comprises the telephone server automatically calling the first client device.

The initiating of the first call leg of an embodiment comprises the first client device automatically answering the call from the telephone server.

The initiating of the first call leg of an embodiment comprises the telephone server automatically terminating the initiating absent an answer by the first client device.

The method of an embodiment includes transferring a first signal from the server to the first client device via the first call leg.

The first signal of an embodiment confirms to the first client device that the first call leg is being initiated by the server.

The first client device of an embodiment disconnects the first call leg absent receipt of the first signal.

The first signal of an embodiment includes a dual-tone multi-frequency (DTMF) signal.

The method of an embodiment includes transferring a second signal from the first client device to the server via the first call leg in response to receiving the first signal.

The server of an embodiment disconnects the first call leg absent receipt of the second signal.

The second signal of an embodiment includes a DTMF signal.

The method of an embodiment includes re-initiating the first call leg in response to termination of the first call leg by one or more of the first client device and the server.

The initiating of the second call leg of an embodiment is in response to the receiving of the second signal.

The method of an embodiment includes the server instructing the telephone server to generate the second call leg. The second call leg of an embodiment includes a second voice channel of an enterprise coupled to the telephone server.

The method of an embodiment includes disconnecting the first call leg when the initiating of the second call leg fails.

The method of an embodiment includes transferring a message via the first call leg to the first client device in response to successfully establishing the first call leg via a voice channel.

The dial request of an embodiment includes contact data of at least one call recipient. The initiating of the second call leg of an embodiment comprises the telephone server automatically calling the second client device using the contact data.

The second call leg of an embodiment includes a second voice channel.

The method of an embodiment includes receiving a third signal from the second client device via the second call leg.

The third signal of an embodiment is received at the server in response to the initiating of the second call leg.

The method of an embodiment includes automatically transmitting a prompt to the second client device via the second call leg. The third signal of an embodiment is received in response to the prompt.

The third signal of an embodiment includes a DTMF signal.

The joining of the first call leg and the second call leg of an embodiment is in response to the receiving of the third signal.

The method of an embodiment includes disconnecting the first call leg in response to detecting termination of the second call leg. The method of an embodiment includes disconnecting the second call leg in response to detecting termination of the first call leg.

The server of an embodiment includes at least one enterprise server of the enterprise.

The telephone server of an embodiment includes a private branch exchange (PBX) coupled to the enterprise.

The dial request of an embodiment includes contact data of a plurality of call recipients. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes initiating at least one other call leg with at least one other client device of at least one of the plurality of call recipients.

The initiating of the at least one other call leg of an embodiment comprises the telephone server automatically calling the at least one other client device using the contact data.

The at least one other call leg of an embodiment includes at least one other voice channel.

The method of an embodiment includes receiving at least one other signal from the at least one other client device via the at least one other call leg.

The at least one other signal of an embodiment is received at the telephone server in response to the initiating of the at least one other call leg.

The method of an embodiment includes automatically transmitting a prompt to the at least one other client device via the at least one other call leg. The at least one other signal is received in response to the prompt.

The method of an embodiment includes joining the at least one other call leg to the first call leg and the second call leg.

The joining of the at least one other call leg of an embodiment is in response to the receiving of the at least one other signal.

The dial request of an embodiment includes information of a class.

The initiating of the second call leg between the telephone server and the second client device of an embodiment comprises initiating the second call leg between the telephone server and resources of a class group. The resources of an embodiment possess an attribute of the class.

The class group of an embodiment includes one or more resources having one or more attributes in common.

The method of an embodiment includes determining the resources from a plurality of contacts of an enterprise. The enterprise of an embodiment includes the resources.

The initiating of an embodiment comprises attempting to initiate the second call leg with a plurality of client devices. The plurality of client devices of an embodiment corresponds to the resources. The plurality of client devices of an embodiment includes the second client device.

The attempting to initiate of an embodiment includes attempting in parallel to initiate the second call leg with each of the plurality of client devices.

The method of an embodiment includes calling at least one target device of a first set of the plurality of client devices. The method of an embodiment includes calling at least one target device of a second set of the plurality of client devices.

The attempting to initiate of an embodiment includes attempting in sequence to initiate the second call leg with each of the plurality of client devices.

The method of an embodiment includes determining a hierarchy of the attempting, wherein the hierarchy defines an order of the sequence.

The attempting to initiate of an embodiment includes attempting in parallel to initiate the second call leg with each of a first set of the plurality of client devices. The attempting to initiate of an embodiment includes attempting in sequence to initiate the second call leg with each of a second set of the plurality of client devices.

The attempting to initiate of an embodiment includes attempting to initiate according to availability of the resources. The availability of an embodiment includes one or more of presence of the resources, reachable status of the resources, availability determined by a host system, and availability specified by the resources.

The attempting to initiate of an embodiment includes attempting to initiate in accordance with context information. The context information of an embodiment includes at least one of a connectivity state and an availability profile of each of the plurality of client devices.

The first client device of an embodiment remotely controls the server to initiate the voice conference call between two telephone numbers. The remote control of an embodiment is via a data channel coupled to the first client device and the server.

In response to the call initiation message, initiating the first call leg of an embodiment between the telephone server and a remote communication device instead of initiating the first call leg with the client device. In response to the call initiation message, initiating the second call leg of an embodiment between the telephone server the first client device instead of the second client device.

The server of an embodiment is hosted by one or more of an enterprise, a service provider, and a mobile network operator.

One or more of the first call leg and the second call leg of an embodiment is provided by one or more of an enterprise, a service provider, and a mobile network operator.

The method of an embodiment includes transferring signals between the first client device and the server via a data channel that includes a cellular data channel of a cellular network.

The method of an embodiment includes transferring media between the first client device and the server via the first call leg. The first call leg of an embodiment includes a cellular voice channel of a cellular network.

The communication systems of an embodiment include a system comprising a server coupled to an enterprise and at least one communication network. The server of an embodiment is configured to receive a dial request from a first client device and transfer a call initiation message to a telephone server in response to the dial request. The telephone server of an embodiment is configured to initiate a first call leg with the first client device in response to the call initiation message. The server of an embodiment is configured to initiate a second call leg between the telephone server and a second client device. The server of an embodiment is configured to join the first call leg and the second call leg to form a voice conference call.

The server of an embodiment includes at least one enterprise server of the enterprise.

The telephone server of an embodiment includes a private branch exchange (PBX) coupled to the enterprise.

The first call leg of an embodiment includes a first voice channel and the second call leg includes a second voice channel.

The server of an embodiment receives the dial request via a data channel coupled to the first client device.

The voice conference call of an embodiment between the first client device and the second client device is via the telephone server, wherein the first client device is a mobile device and the telephone server is hosted by an enterprise.

Each of the first client device and the second client device of an embodiment includes one or more of a mobile device, a wireless device, a wireline device, a voice over Internet Protocol (VOIP) device, a private branch exchange device, a soft client, and a desktop client.

The dial request of an embodiment includes contact data of at least one call recipient corresponding to the second client device. The contact data of an embodiment includes one or more of a telephone number and uniform resource locator (URL).

The server of an embodiment is configured to transfer contact data of at least one call recipient to the first client device in response to the dial request. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The call initiation message of an embodiment instructs the telephone server to generate the first call leg using a first voice channel of an enterprise coupled to the telephone server. The call initiation message of an embodiment includes a telephone number.

The telephone server of an embodiment is configured to initiate the first call leg by automatically calling the first client device.

The server of an embodiment is configured to signal the first client device via the first call leg to confirm that the first call leg is being initiated by the server.

The server of an embodiment is configured to receive a second signal from the first client device via the first call leg in response to the first signal.

The server of an embodiment is configured to instruct the telephone server to generate the second call leg in response to receipt of the second signal. The second call leg of an embodiment includes a second voice channel of an enterprise coupled to the telephone server.

The dial request of an embodiment includes contact data of at least one call recipient. The telephone server of an embodiment is configured to initiate the second call leg by automatically calling the second client device using the contact data.

The server of an embodiment is configured to receive a third signal from the second client device via the second call leg in response to the initiating of the second call leg.

The joining of the first call leg and the second call leg of an embodiment is in response to the receiving of the third signal.

The server of an embodiment is configured to disconnect the first call leg in response to detecting termination of the second call leg and disconnect the second call leg in response to detecting termination of the first call leg.

The communication systems of an embodiment include a computer readable media including executable instructions which, when executed in a processing system, provide calling via a remote telephone system by receiving a dial request from a first client device at a server. The instructions of an embodiment, when executed, provide calling via a remote telephone system by transferring a call initiation message from the server to a telephone server in response to the dial request. The instructions of an embodiment, when executed, provide calling via a remote telephone system by initiating a first call leg between the telephone server and the first client device in response to the call initiation message. The instructions of an embodiment, when executed, provide calling via a remote telephone system by initiating a second call leg between the telephone server and a second client device. The instructions of an embodiment, when executed, provide calling via a remote telephone system by joining the first call leg and the second call leg to form a voice conference call.

The communication systems of an embodiment enable ad-hoc conferencing as described above. In so doing, the communication systems of an embodiment include a method comprising receiving a request at a server via a data channel coupled to a mobile device. The method of an embodiment includes initiating in response to the request a first call leg over a first voice channel. The first call leg of an embodiment is between the server and the mobile device. The method of an embodiment includes initiating a plurality of second call legs over a plurality of second voice channels. The plurality of second call legs of an embodiment are between the server and a plurality of client devices. The method of an embodiment includes forming a voice conference call between the mobile device and the plurality of client devices by joining the first call leg and the plurality of second call legs.

Each of the mobile device and the plurality of client devices of an embodiment includes one or more of a mobile device, a wireless device, a wireline device, a voice over Internet Protocol (VOIP) device, a private branch exchange device, a soft client, and a desktop client.

The receiving of the request of an embodiment is via a data channel coupled to the mobile device and the server.

The request of an embodiment includes contact data of a plurality of call recipients corresponding to the plurality of client devices. The contact data of an embodiment includes a telephone number. The method of an embodiment includes receiving at the mobile device a selection of the plurality of call recipients.

The server of an embodiment includes one or more of a server and a private branch exchange (PBX).

The initiating of the first call leg of an embodiment comprises transmitting a call initiation message from the server to the mobile device in response to the request. The initiating of the first call leg of an embodiment comprises initiating the first call leg between the mobile device and the telephone server. The initiating of an embodiment uses information of the call initiation message.

The transmitting of the call initiation message of an embodiment is via the data channel.

The call initiation message of an embodiment includes a telephone number, wherein the initiating of the first call leg comprises the mobile device automatically calling the telephone server using the telephone number.

The method of an embodiment includes receiving a first signal from the mobile device via the first call leg, wherein the first signal is sent in response to the initiating of the first call leg.

The initiating of the plurality of second call legs of an embodiment is in response to the receiving of the first signal.

The request of an embodiment includes contact data of a plurality of call recipients. The initiating of the plurality of second call legs of an embodiment comprises the telephone server automatically calling the plurality of client devices using the contact data.

The method of an embodiment includes receiving at least one second signal from at least one client device of the plurality of client devices via at least one call leg of the plurality of second call legs. The at least one second signal of an embodiment is received at the server in response to the initiating of the plurality of second call legs.

The method of an embodiment includes automatically transmitting a prompt to the at least one client device via the at least one call leg. The at least one second signal of an embodiment is received in response to the prompt.

The joining of the first call leg and the plurality of second call legs of an embodiment is in response to the receiving of the at least one second signal.

The joining of an embodiment includes joining the first call leg to ones of the plurality of second call legs that correspond to ones of the plurality of client devices from which a second signal is received.

The method of an embodiment includes disconnecting the first call leg when the initiating of all of the plurality of second call legs fails.

The method of an embodiment includes sending contact data of the plurality of call recipients to the mobile device in response to the request. The contact data of an embodiment includes one or more of data of an enterprise coupled to the server, name, address, telephone number, electronic mail address, employer, position, data of at least one interaction, personal data comprising data of one or more of a spouse, relative, child, anniversary, and birthday.

The method of an embodiment includes transferring a call initiation message from the server to the telephone server in response to the request. The method of an embodiment includes initiating the first call leg between the telephone server and the mobile device in response to the call initiation message.

The call initiation message of an embodiment instructs the telephone server to generate the first call leg using a first voice channel of the enterprise.

The call initiation message of an embodiment includes a telephone number. The initiating of the first call leg of an embodiment comprises the telephone server automatically calling the mobile device.

The method of an embodiment includes transferring a third signal from the server to the mobile device via the first call leg. The third signal of an embodiment confirms to the mobile device that the first call leg is being initiated by the server.

The method of an embodiment includes transferring a fourth signal from the mobile device to the server via the first call leg in response to receiving the third signal.

The initiating of the second call leg of an embodiment is in response to the receiving of the fourth signal.

The method of an embodiment includes the server instructing the telephone server to generate the plurality of second call legs.

The method of an embodiment includes disconnecting the first call leg when the initiating of all of the plurality of second call legs fails.

The request of an embodiment includes contact data of a plurality of call recipients. The initiating of the plurality of second call legs of an embodiment comprises the telephone server automatically calling the plurality of client devices using the contact data.

The method of an embodiment includes receiving a plurality of fifth signals from the plurality of client devices via the plurality of second call legs in response to the initiating of the plurality of second call legs.

The joining of the first call leg and the plurality of second call legs of an embodiment is in response to the receiving of the plurality of fifth signals.

The joining of an embodiment includes joining the first call leg to ones of the plurality of second call legs that correspond to ones of the plurality of client devices from which a fifth signal is received.

The method of an embodiment includes re-initiating the first call leg in response to termination of the first call leg by one or more of the mobile device and the server.

The method of an embodiment includes disconnecting the first call leg in response to detecting termination of the plurality of second call legs. The method of an embodiment includes disconnecting the plurality of second call legs in response to detecting termination of the first call leg.

The request of an embodiment includes information of a class.

The initiating of the plurality of second call legs of an embodiment comprises initiating the plurality of second call legs between the telephone server and resources of a class group. The resources of an embodiment possess an attribute of the class. The class group of an embodiment includes one or more resources having one or more attributes in common.

The method of an embodiment includes determining the resources from a plurality of contacts of an enterprise.

The initiating of an embodiment comprises attempting to initiate the plurality of second call legs with the plurality of client devices. The plurality of client devices of an embodiment corresponds to the resources.

The attempting to initiate of an embodiment includes attempting in parallel to initiate the second call leg with each of the plurality of client devices.

The attempting to initiate of an embodiment includes attempting in sequence to initiate the second call leg with each of the plurality of client devices.

The method of an embodiment includes determining a hierarchy of the attempting. The hierarchy of an embodiment defines an order for attempting to initiate the plurality of second call legs with the plurality of client devices.

The attempting to initiate of an embodiment includes attempting in parallel to initiate the plurality of second call legs with each of a first set of the plurality of client devices. The attempting to initiate of an embodiment includes attempting in sequence to initiate at least one second call leg of the plurality of second call legs with each of a second set of the plurality of client devices.

The attempting to initiate of an embodiment includes attempting to initiate according to availability of the resources. The availability of an embodiment includes one or more of presence of the resources, reachable status of the resources, availability determined by a host system, and availability specified by the resources.

The attempting to initiate of an embodiment includes attempting to initiate in accordance with context information. The context information of an embodiment includes at least one of a connectivity state and an availability profile of each of the plurality of client devices.

The server of an embodiment is hosted by one or more of an enterprise, a service provider, and a mobile network operator.

One or more of the data channel, the first voice channel and the second voice channel of an embodiment is provided by one or more of an enterprise, a service provider, and a mobile network operator.

The method of an embodiment includes transferring signals between the mobile device and the server via the data channel. The data channel of an embodiment includes a cellular data channel of a cellular network.

The method of an embodiment includes transferring media between the mobile device and the server via the first voice channel. The first voice channel of an embodiment includes a cellular voice channel of a cellular network.

The communication systems of an embodiment include a system comprising a server coupled to an enterprise and at least one communication network. The server of an embodiment is configured to receive a request via a data channel coupled to a mobile device and initiate in response to the request a first call leg with a mobile device over a first voice channel. The server of an embodiment is configured to initiate a plurality of second call legs with a plurality of client devices over a plurality of second voice channels. The server of an embodiment is configured to form a voice conference call between the mobile device and the plurality of client devices by joining the first call leg and the plurality of second call legs.

The server of an embodiment is hosted by one or more of the enterprise, a service provider, and a mobile network operator.

One or more of the data channel, the first voice channel and the plurality of second voice channels of an embodiment is provided by one or more of the enterprise, a service provider, and a mobile network operator.

Each of the mobile device and the plurality of client devices of an embodiment includes one or more of a mobile device, a wireless device, a wireline device, a voice over Internet Protocol (VOIP) device, a private branch exchange device, a soft client, and a desktop client.

The request includes of an embodiment contact data of a plurality of call recipients corresponding to the plurality of client devices. The contact data of an embodiment includes a telephone number.

The server of an embodiment includes one or more of a server and a private branch exchange (PBX).

The server of an embodiment is configured to initiate the first call leg by transmitting a call initiation message via the data channel to the mobile device in response to the request, and initiating the first call leg between the mobile device and the telephone server using information of the call initiation message.

The call initiation message of an embodiment includes a telephone number. The mobile device of an embodiment is configured to automatically call the telephone server using the telephone number.

The server of an embodiment is configured to receive a first signal from the mobile device via the first call leg. The first signal of an embodiment is sent in response to the initiating of the first call leg. The initiating of the plurality of second call legs of an embodiment is in response to receipt of the first signal.

The request of an embodiment includes contact data of a plurality of call recipients. The telephone server of an embodiment is configured to initiate the plurality of second call legs by automatically calling the plurality of client devices using the contact data.

The server of an embodiment is configured to receive at least one second signal from at least one client device of the plurality of client devices via at least one call leg of the plurality of second call legs. The at least one second signal of an embodiment is received at the server in response to the initiating of the plurality of second call legs.

The server of an embodiment is configured to join the first call leg and the plurality of second call legs in response to receipt of the at least one second signal. The joining of an embodiment includes joining the first call leg to ones of the plurality of second call legs that correspond to ones of the plurality of client devices from which a second signal is received.

The server of an embodiment is configured to transfer a call initiation message to instruct the telephone server in response to the request.

The telephone server of an embodiment is configured to generate the first call leg using a first voice channel of the enterprise in response to the call initiation message.

The call initiation message of an embodiment includes a telephone number. The telephone server of an embodiment is configured to initiate the first call leg by automatically calling the mobile device via the telephone number.

The server of an embodiment is configured to signal the mobile device via a third signal. The third signal of an embodiment confirms to the mobile device that the first call leg is being initiated by the server.

The server of an embodiment is configured to receive a fourth signal from the mobile device in response to the third signal. The server of an embodiment initiates the second call leg in response to receipt of the fourth signal.

The server of an embodiment is configured to instruct the telephone server to generate the plurality of second call legs.

The server of an embodiment is configured to receive a plurality of fifth signals from the plurality of client devices via the plurality of second call legs in response to the initiating of the plurality of second call legs.

The server of an embodiment is configured to join the first call leg and the plurality of second call legs in response to receipt of the plurality of fifth signals. The joining of an embodiment includes joining the first call leg to ones of the plurality of second call legs that correspond to ones of the plurality of client devices from which a fifth signal is received.

The server of an embodiment is configured to disconnect the first call leg in response to detecting termination of the plurality of second call legs, and disconnect the plurality of second call legs in response to detecting termination of the first call leg.

The server of an embodiment is configured to exchange signals with the mobile device via the data channel. The data channel of an embodiment includes a cellular data channel of a cellular network.

The server of an embodiment is configured to exchange media with the mobile device via the first voice channel. The first voice channel of an embodiment includes a cellular voice channel of a cellular network.

The communication systems of an embodiment include a computer readable media including executable instructions which, when executed in a processing system, provide conferencing by receiving a request at a server via a data channel coupled to a mobile device. The executable instructions of an embodiment, when executed, provide conferencing by initiating in response to the request a first call leg over a first voice channel, the first call leg between the server and the mobile device. The executable instructions of an embodiment, when executed, provide conferencing by initiating a plurality of second call legs over a plurality of second voice channels. The plurality of second call legs of an embodiment are between the server and a plurality of client devices. The executable instructions of an embodiment, when executed, provide conferencing by forming a voice conference call between the mobile device and the plurality of client devices by joining the first call leg and the plurality of second call legs.

Aspects of the communications systems described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the communications systems include: microcontrollers with memory (such as electronically erasable programmable read-only memory (EEPROM)), embedded microprocessors, firmware, etc. Furthermore, aspects of the communications systems may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the various systems and methods disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media).

Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the communications systems is not intended to be exhaustive or to limit the systems and methods described to the precise form disclosed. While specific embodiments of, and examples for, the communications systems are described herein for illustrative purposes, various equivalent modifications are possible within the scope of other communications systems and methods, as those skilled in the relevant art will recognize. The teachings of the communications systems provided herein can be applied to other processing systems and methods, not only for the systems and methods described above.

The elements and acts of the various embodiments described above can be combined to provide further embodiments. These and other changes can be made to the communications systems in light of the above detailed description.

In general, in the following claims, the terms used should not be construed to limit the communications systems to the specific embodiments disclosed in the specification and the claims, but should be construed to include all systems that operate under the claims. Accordingly, the communications systems are not limited by the disclosure, but instead the scope of the communications systems is to be determined entirely by the claims.

While certain aspects of the communications systems are presented below in certain claim forms, the inventors contemplate the various aspects of the communications systems in any number of claim forms. Accordingly, the inventors reserve the right to add additional claims after filing the application to pursue such additional claim forms for other aspects of the communications systems.

What is claimed is:

1. A method comprising:
   receiving a dial request, via a data channel, from a first client device at a server;
   transferring a call initiation message from the server to a telephone server in response to the dial request;
   the server sending data representative of a transaction identifier and a call in telephone number for the telephone server to the first client;
   the first client initiating a first call leg with the telephone server, the first client calling the telephone server on the call in telephone number, and upon successfully connecting to the telephone server sending the transaction identifier to the telephone server;
   the telephone server is responsive to receiving the transaction identifier from the client to initiate a second call leg by placing a voice call to a second client device; and
   upon successfully establishing a voice call with the second client device, the telephone server joins the first call leg and the second call leg establishing a voice call between the first client and the second client.

2. The method of claim 1, wherein the voice conference call between the first client device and the second client device is via the telephone server, wherein the first client device is a mobile device and the telephone server is hosted by an enterprise.

3. The method of claim 1, wherein each of the first client device and the second client device includes one or more of a mobile device, a wireless device, a wireline device, a voice over Internet Protocol (VOIP) device, a private branch exchange device, a soft client, and a desktop client.

4. The method of claim 1, wherein the dial request includes contact data of at least one call recipient corresponding to the second client device, wherein the contact data includes one or more of a telephone number and uniform resource locator (URL).

5. The method of claim 4, comprising receiving at the first client device a selection of the at least one call recipient.

6. The method of claim 1, comprising sending contact data of at least one call recipient to the first client device in response to the dial request, wherein the contact data includes one or more of data of an enterprise coupled to the server, name; address, telephone number, electronic mail address, employer, position, data of at least one interaction, personal data comprising data of one or more of a spouse, relative, child, anniversary, and birthday.

7. The method of claim 1, comprising transferring a message via a data channel to the first client device in response to successful receipt of the dial request at the server.

8. The method of claim 1, wherein the call initiation message includes a telephone number.

9. The method of claim 1, wherein the first client sends the transaction identifier via a dual-tone multi-frequency (DTMF) signal.

10. The method of claim 1, wherein the dial request includes contact data of at least one call recipient, wherein the initiating of the second call leg comprises the telephone server automatically calling the second client device using the contact data.

11. The method of claim 1, comprising:
    disconnecting the first call leg in response to detecting termination of the second call leg;
    and disconnecting the second call leg in response to detecting termination of the first call leg.

12. The method of claim 1, wherein the server includes at least one enterprise server of the enterprise.

13. The method of claim 1, wherein the telephone server includes a private branch exchange (PBX) coupled to the enterprise.

14. A method comprising:
    receiving a dial request, via a data channel, from a first client device at a server, wherein the dial request includes contact data of a plurality of call recipients, wherein the contact data includes one or more of data of an enterprise coupled to the server, name, address, telephone number, electronic mail address, employer, position, data of at least one interaction, personal data comprising data of one or more of a spouse, relative, child, anniversary, and birthday;
    the server transferring a call initiation message to a telephone server in response to the dial request;
    the server sending data representative of a transaction identifier and a call in telephone number for the telephone server to the first client;
    the first client initiating a first call leg with the telephone server by initiating a call with the telephone server using the call in telephone number in response to receiving the data representative of a transaction identifier and a call in telephone number for the telephone server;

the telephone server initiating at least one other call leg between the telephone server and at least one other client device of at least one of the plurality of call recipients; and the telephone server joining the first call leg with the at least one other call leg.

15. The method of claim 14, wherein the at least one other call leg includes at least one other voice channel.

16. The method of claim 14, comprising receiving at least one other signal from the at least one other client device via the at least one other call leg.

17. The method of claim 16, wherein the at least one other signal is received at the telephone server in response to the initiating of the at least one other call leg.

18. The method of claim 16, comprising automatically transmitting a prompt to the at least one other client device via the at least one other call leg, wherein the at least one other signal is received in response to the prompt.

19. The method of claim 14, wherein the joining of the at least one other call leg is in response to the receiving of the at least one other signal.

20. A method comprising:
receiving a dial request via a data channel from a first client device at a server, wherein the dial request includes information of a class having an attribute;
transferring a call initiation message from the server to a telephone server in response to the dial request;
the server sending data representative of a transaction identifier and a call in telephone number for the telephone server to the first client;
the first client device initiating a first call leg by calling the call in number for the telephone server in response to receiving the data representative of a transaction identifier and a call in telephone number for the telephone server;
the telephone server initiating at least one second call leg between the telephone server and selected resources of a class group possessing the attribute of the class responsive to the first call leg being established; and,
joining the first call leg with the at least one second call leg to form a voice conference call between the first client device and one or more target devices corresponding to the selected resources of the class group.

21. The method of claim 20, wherein the class group includes one or more resources having one or more attributes in common.

22. The method of claim 20, comprising determining the resources from a plurality of contacts of an enterprise, wherein the enterprise includes the resources.

23. The method of claim 20, wherein the initiating comprises attempting to initiate the second call leg with a plurality of client devices, wherein the plurality of client devices correspond to the resources, the plurality of client devices including the second client device.

24. The method of claim 23, wherein the attempting to initiate includes attempting in parallel to initiate the second call leg with each of the plurality of client devices.

25. The method of claim 24, comprising:
calling at least one target device of a first set of the plurality of client devices; and calling at least one target device of a second set of the plurality of client devices.

26. The method of claim 23, wherein the attempting to initiate includes attempting in sequence to initiate the second call leg with each of the plurality of client devices.

27. The method of claim 26, comprising determining a hierarchy of the attempting, wherein the hierarchy defines an order of the sequence.

28. The method of claim 23, wherein the attempting to initiate includes:
attempting in parallel to initiate the second call leg with each of a first set of the plurality of client devices; and
attempting in sequence to initiate the second call leg with each of a second set of the plurality of client devices.

29. The method of claim 23, wherein the attempting to initiate includes attempting to initiate according to availability of the resources, wherein the availability includes one or more of presence of the resources, reachable status of the resources, availability determined by a host system, and availability specified by the resources.

30. The method of claim 23, wherein the attempting to initiate includes attempting to initiate in accordance with context information, the context information including at least one of a connectivity state and an availability profile of each of the plurality of client devices.

31. The method of claim 1, wherein the first client device remotely controls the server to initiate the voice conference call between two telephone numbers, wherein the remote control is via a data channel coupled to the first client device and the server.

32. A system comprising
a facilitator coupled to an enterprise and at least one communication network, and
a telephone server in communication with the facilitator;
wherein the server configured to receive a dial request, via a data channel, from a first client device;
the server is further configured to send a call initiation message to the telephone server in response to the dial request, and to send data representative of a transaction identifier and a call in telephone number for the telephone server to the first client device:
wherein the telephone server configured to receive a telephone call from the first client device in response to the call initiation message;
wherein the server configured to initiate a second call leg between a with a second client device in response to the first call leg being established;
wherein the server configured to join the first call leg with the second call leg in response to establishing the second call leg.

33. The system of claim 32, wherein the server includes at least one enterprise server of the enterprise.

34. The system of claim 32, wherein the telephone server includes a private branch exchange (PBX) coupled to the enterprise.

35. The system of claim 32, wherein the voice conference call between the first client device and the second client device is via the telephone server, wherein the first client device is a mobile device and the telephone server is hosted by an enterprise.

36. The system of claim 32, wherein each of the first client device and the second client device includes one or more of a mobile device, a wireless device, a wireline device, a voice over Internet Protocol (VOIP) device, a private branch exchange device, a soft client, and a desktop client.

37. The system of claim 32, wherein the dial request includes contact data of at least one call recipient corresponding to the second client device, wherein the contact data includes one or more of a telephone number and uniform resource locator (URL).

38. The system of claim 32, wherein the server is configured to transfer contact data of at least one call recipient to the first client device in response to the dial request, wherein the contact data includes one or more of data of an enterprise coupled to the server, name, address, telephone number, electronic mail address, employer, position, data of at least one interaction, personal data comprising data of one or more of a spouse, relative, child, anniversary, and birthday.

39. The system of claim 32, wherein the dial request includes contact data of at least one call recipient, wherein the telephone server is configured to initiate the second call leg by automatically calling the second client device using the contact data.

40. The system of claim 32, wherein the server is configured to disconnect the first call leg in response to detecting termination of the second call leg and disconnect the second call leg in response to detecting termination of the first call leg.

41. A computer readable media including executable instructions which, when executed in a processing system, provide calling via a remote telephone system by:

receiving a dial request from a first client device at a server, via a data channel;

transferring a call initiation message from the server to a telephone server in response to the dial request;

sending data representative of a transaction identifier and a call in telephone number to the first client device;

receiving by the telephone server a telephone call from the first client device at the call in telephone number, establishing a first call leg;

receiving data representative of the transaction identifier from the first client device after establishing the first call leg;

the telephone server establishing a second call leg with a second client device responsive to receiving the transaction identifier; and the telephone server joining the first call leg and the second call leg responsive to establishing the second call leg.

* * * * *